United States Patent
Peled et al.

(10) Patent No.: US 11,343,358 B2
(45) Date of Patent: May 24, 2022

(54) FLEXIBLE HEADER ALTERATION IN NETWORK DEVICES

(71) Applicant: Marvell Israel (M.I.S.L) Ltd., Yokneam (IL)

(72) Inventors: Yuval Peled, Kiryat Ono (IL); Doron Schupper, Rehovot (IL); Ilan Yerushalmi, Hod Hasharon (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 171 days.

(21) Appl. No.: 16/773,772

(22) Filed: Jan. 27, 2020

(65) Prior Publication Data

US 2020/0244780 A1    Jul. 30, 2020

Related U.S. Application Data

(60) Provisional application No. 62/798,240, filed on Jan. 29, 2019.

(51) Int. Cl.
*H04L 69/22* (2022.01)
*H04L 47/2441* (2022.01)
(Continued)

(52) U.S. Cl.
CPC .............. *H04L 69/22* (2013.01); *H04L 45/74* (2013.01); *H04L 47/2441* (2013.01); *H04L 69/12* (2013.01); *H04L 69/16* (2013.01)

(58) Field of Classification Search
None
See application file for complete search history.

(56) References Cited

U.S. PATENT DOCUMENTS 6,304,903 B1   10/2001   Ward
6,665,725 B1   12/2003   Dietz
(Continued)

FOREIGN PATENT DOCUMENTS

WO    WO 1999/007180    2/1999

OTHER PUBLICATIONS

Pagiamtzis et al. "Content-Addressable Memory (CAM) Circuits and Architectures: A Tutorial and Survey," IEEE Journal of Solid-State Circuits, vol. 31, No. 3, pp. 712-727 (Mar. 2006).
(Continued)

*Primary Examiner* — Ajit Patel
*Assistant Examiner* — Keith Follansbee

(57) ABSTRACT

At least a packet header of a packet received by a network device is provided to a programmable header alteration engine that includes a hardware input processor implemented in hardware and a programmable header alteration processor configured to execute computer readable instructions stored in a program memory. The hardware input processor determines whether the packet header is to be provided to a processing path coupled to the programmable header alteration processor or to be diverted to a bypass path that bypasses the programmable header alteration processor, and the packet header is provided to the processing path or to the bypass path based on the determination. The packet header is selectively i) processed by the programmable header alteration processor when the packet header is provided to the processing path and ii) not processed by the programmable header alteration processor when the packet header is provided to the bypass path.

22 Claims, 11 Drawing Sheets

(51) Int. Cl.
*H04L 45/74* (2022.01)
*H04L 69/16* (2022.01)
*H04L 69/12* (2022.01)

(56) References Cited

U.S. PATENT DOCUMENTS

| | | | |
|---|---|---|---|
| 6,741,591 | B1 | 5/2004 | Kaldani et al. |
| 7,020,657 | B2 | 3/2006 | Rumph |
| 7,046,687 | B1 | 5/2006 | Brown et al. |
| 7,212,531 | B1 | 5/2007 | Kopelman et al. |
| 7,426,608 | B1 | 9/2008 | Kao |
| 7,453,892 | B2 | 11/2008 | Buskirk et al. |
| 7,539,195 | B2 | 5/2009 | Paatela et al. |
| 7,664,938 | B1 | 2/2010 | Tripathi et al. |
| 7,924,860 | B1 | 4/2011 | Frailong et al. |
| 7,978,700 | B2 | 7/2011 | Kopelman et al. |
| 8,111,690 | B2 | 2/2012 | Hussain et al. |
| 8,571,035 | B2 | 10/2013 | Kopelman et al. |
| 8,848,715 | B2 | 9/2014 | Izenberg et al. |
| 9,118,576 | B2 * | 8/2015 | Roitshtein .......... H04L 49/1523 |
| 9,455,907 | B1 | 9/2016 | Shumsky et al. |
| 9,467,399 | B2 | 10/2016 | Wohlgemuth et al. |
| 9,479,620 | B2 | 10/2016 | Levy et al. |
| 9,571,380 | B2 | 2/2017 | Kadosh et al. |
| 9,729,442 | B1 | 8/2017 | Stark et al. |
| 9,923,813 | B2 | 3/2018 | Levy et al. |
| 9,954,771 | B1 | 4/2018 | Levy et al. |
| 10,009,270 | B1 | 6/2018 | Stark et al. |
| 10,033,638 | B1 | 7/2018 | Stark et al. |
| 10,230,810 | B1 | 3/2019 | Bhide et al. |
| 10,263,919 | B1 | 4/2019 | Matthews et al. |
| 10,616,001 | B2 | 4/2020 | Mayer-Wolf et al. |
| 2002/0163909 | A1 | 11/2002 | Sarkinen et al. |
| 2003/0210702 | A1 | 11/2003 | Kendall |
| 2004/0066748 | A1 | 4/2004 | Burnett |
| 2004/0090974 | A1 | 5/2004 | Balakrishnan et al. |
| 2004/0100950 | A1 | 5/2004 | Basu et al. |
| 2005/0141513 | A1 | 6/2005 | Oh et al. |
| 2006/0050693 | A1 * | 3/2006 | Bury .................. H04L 49/901 |
| | | | 370/389 |
| 2008/0095149 | A1 | 4/2008 | Dai |
| 2008/0114887 | A1 | 5/2008 | Bryers et al. |
| 2008/0225874 | A1 | 9/2008 | Lee |
| 2008/0232374 | A1 | 9/2008 | Kopelman |
| 2009/0147683 | A1 | 6/2009 | Mustafa |
| 2010/0150158 | A1 | 6/2010 | Cathey et al. |
| 2011/0149966 | A1 | 6/2011 | Pope et al. |
| 2011/0255540 | A1 | 10/2011 | Mizrahi et al. |
| 2011/0274112 | A1 | 11/2011 | Czaszar et al. |
| 2012/0002546 | A1 | 1/2012 | Sundararaman et al. |
| 2012/0020373 | A1 | 1/2012 | Subramanian et al. |
| 2012/0177047 | A1 | 7/2012 | Roitshtein |
| 2013/0016725 | A1 | 1/2013 | Julien et al. |
| 2014/0098816 | A1 * | 4/2014 | Matthews ............. H04L 49/00 |
| | | | 370/390 |
| 2014/0169378 | A1 | 6/2014 | Shumsky et al. |
| 2014/0177470 | A1 | 6/2014 | Roitshtein et al. |
| 2014/0185442 | A1 | 7/2014 | Newman et al. |
| 2014/0192815 | A1 | 7/2014 | Shumsky et al. |
| 2014/0286352 | A1 * | 9/2014 | Turgeman ........... H04L 49/252 |
| | | | 370/429 |
| 2014/0334488 | A1 | 11/2014 | Guichard et al. |
| 2015/0009809 | A1 | 1/2015 | Zhang |
| 2015/0016458 | A1 | 1/2015 | Patel et al. |
| 2015/0071079 | A1 | 3/2015 | Kadosh et al. |
| 2015/0110113 | A1 | 4/2015 | Levy et al. |
| 2015/0113190 | A1 | 4/2015 | Wohlgemuth et al. |
| 2015/0172188 | A1 | 6/2015 | Levy et al. |
| 2015/0172222 | A1 | 6/2015 | Liao et al. |
| 2015/0277924 | A1 | 10/2015 | Zappulla et al. |
| 2016/0173338 | A1 | 6/2016 | Wolting |
| 2017/0104732 | A1 | 4/2017 | Mundra et al. |
| 2017/0208011 | A1 | 7/2017 | Bosch et al. |
| 2017/0249164 | A1 * | 8/2017 | Petkov ................. G06F 3/0637 |
| 2017/0339074 | A1 | 11/2017 | Melman et al. |
| 2017/0339075 | A1 * | 11/2017 | Arad ................... H04L 49/9084 |
| 2017/0366467 | A1 | 12/2017 | Martin et al. |
| 2018/0287819 | A1 | 10/2018 | Mayer-Wolf et al. |
| 2019/0289102 | A1 * | 9/2019 | Goel ................... H04L 45/7453 |

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q™—2014 (Revision of IEEE Std.802.1Q—2011), "IEEE Standard for Local and Metropolitan Area Networks—Bridges and Bridged Networks," *The Institute of Electrical and Electronics Engineers, Inc.*, 1,832 pages (Nov. 3, 2014).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 GB/s Operation *The Institute of Electrical and Electronics Engineers, Inc.*, 540 pages (May 1, 2002).

Chen, "Home Network Basis: Transmission Environments and Wired/Wireless Protocols," Prentice Hall, 26 pages (2006).

IEEE Std 802.1BR—2012 "IEEE Standard for Local and metropolitan area networks—Virtual Bridged Local Area Networks—Bridge Port Extension," The Institute of Electrical and Electronics Engineers, Inc., 135 pages (May 14, 2012).

Shpiner et al., "Reducing the Reordering Delay in Multi-Core Network Processors", Technical Report TR12-01, Comnet, Technion, Israel, Jan. 2012, 12 pages.

Office Action in U.S. Appl. No. 15/969,116, dated May 15, 2019 (28 pages).

Notice of Allowance in U.S. Appl. No. 15/969,116, dated Nov. 22, 2019 (10 pages).

\* cited by examiner

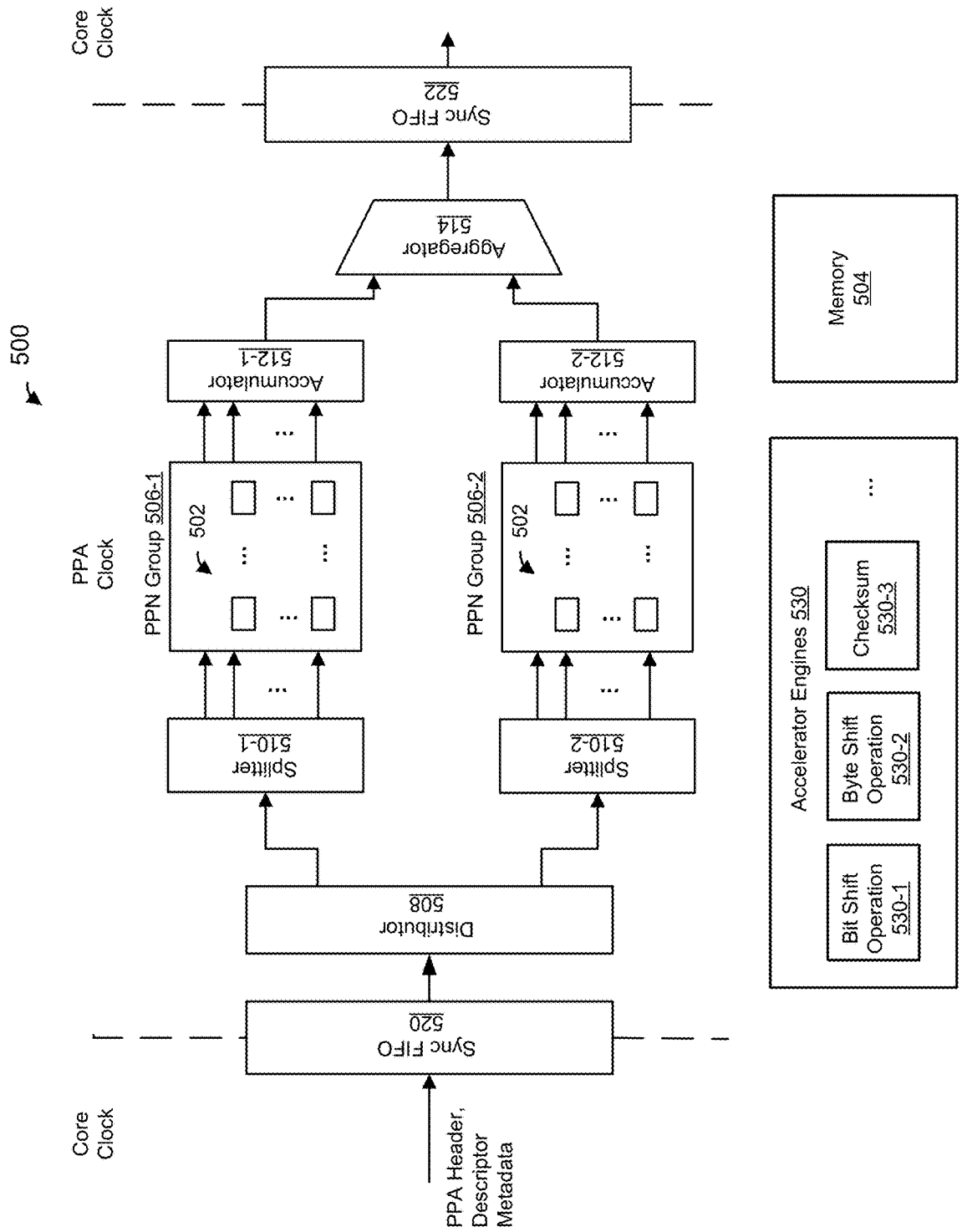

| 31 | 26 25 | 21 20 | 16 15 | 8 7 | 6 0 |
|---|---|---|---|---|---|
| 000000 | 000000 | Length | Pkt | dest byte | Pkt | source byte | byte field copy ← 800

FIG. 8A

| 31 | 26 25 | 23 22 | 20 19 | 16 15 | 14 | 8 7 | 6 0 |
|---|---|---|---|---|---|---|---|
| 000001 | dest bit | source bit | length | pkt | source/dest byte | pkt | source byte | bit field copy ← 850

FIG. 8B

FLEXIBLE HEADER ALTERATION IN NETWORK DEVICES

CROSS-REFERENCES TO RELATED APPLICATIONS

This disclosure claims the benefit of U.S. Provisional Patent Application No. 62/798,240, entitled "Programmable Header Alteration," filed on Jan. 29, 2019, which is hereby incorporated by reference herein in its entirety.

FIELD OF TECHNOLOGY

The present disclosure relates generally to network devices such as network switches, bridges, routers, etc., and more particularly, to processing packets in network devices.

Background

Network devices, such as bridges and routers, forward packets through a network based on addresses in headers of packets. A network device typically includes a plurality of ports coupled to different network links. The network device typically receives a packet via one port and processes a header of the packet at least to decide via which other port or ports the network device should transmit the packet. The network device then forwards the packet to the determined one or more other ports.

During processing of the packets, network devices often perform header alterations to modify headers of at least some of the packets prior to transmission of the packets. Conventionally, header alteration is performed using hardware engines that are able to perform header modification operations a wire-speed. Such hardware header alteration engines typically implement certain pre-determined header alteration operations and lack flexibility for supporting various types of headers and versatile header alteration processing sets. While software implementations of header alteration engines that utilize processors to perform header alteration based on programmable instructions are more flexible, pure software implementations cannot support sufficiently high packet rates and/or cannot support sufficiently varied header alteration operations.

SUMMARY

In an embodiment, a method for processing packets in a network device includes: receiving, at a packet processor of the network device, a packet received by the network device from a network link; determining, with the packet processor, at least one egress interface via which the packet is to be transmitted by the network device; providing at least a packet header of the packet to a programmable header alteration engine of the packet processor, the programmable header alteration engine including i) a hardware input processor implemented in hardware and ii) a programmable header alteration processor coupled to a program memory, the programmable header alteration processor being configured to execute computer readable instructions stored in the program memory to perform one or more header alteration operations on received packets; determining, with the hardware input processor of the programmable header alteration engine, whether the packet header is to be provided to a processing path coupled to the programmable header alteration processor or to be diverted to a bypass path that bypasses the programmable header alteration processor; providing, with the hardware input processor of the programmable header alteration engine, the packet header to the processing path or to the bypass path based on the determination of whether the packet header is to be provided to the processing path or to be diverted to the bypass path; selectively i) processing the packet header by the programmable header alteration processor when the packet header is provided to the processing path and ii) not processing the packet header by the programmable header alteration processor when the packet header is provided to the bypass path; and transmitting, with the network device, the packet via the at least one egress interface of the network device.

In another embodiment, a network device comprises a packet processor configured to i) receive a packet from a network link and ii) determine at least one egress interface via which the packet is to be transmitted by the network device, and a programmable header alteration engine including i) a hardware input processor implemented in hardware and ii) a programmable header alteration processor coupled to a program memory, the programmable header alteration processor configured to execute computer readable instructions stored in the program memory to perform one or more header alteration operations on received packets. The hardware input processor is configured to determine whether a packet header of the packet is to be provided to a processing path coupled to the programmable header alteration processor or to be diverted to a bypass path that bypasses the programmable header alteration processor, and provide the packet header to the processing path or to the bypass path based on the determination of whether the packet header is to be provided to the processing path or to be diverted to the bypass path. The programmable header alteration processor is configured to selectively i) process the packet header when the packet header is provided to the processing path and ii) not process the packet header when the packet header is provided to the bypass path. The packet processor is further configured to cause the packet to be transmitted via the at least one egress interface of the network device.

In yet another embodiment, a method for processing packets in a network device includes: receiving, at a packet processor of the network device, a packet received by the network device from a network link; determining, with the packet processor, at least one egress interface via which the packet is to be transmitted by the network device; processing a packet header of the packet with a programmable header alteration processor coupled to a program memory, the programmable header alteration processor being configured to execute computer readable instructions stored in the program memory to perform one or more header alteration operations on received packets, the processing including triggering a hardware checksum accelerator engine to calculate a checksum for a bit string corresponding to at least a portion of the packet header, wherein triggering the hardware checksum accelerator engine includes i) partitioning the bit string into a plurality of segments of the bit string and ii) transferring the plurality of segment of the bit string to the hardware checksum accelerator engine; incrementally calculating, with the hardware checksum accelerator, the checksum at least by incrementally summing the respective segments, among the plurality of segments of the bit string, transferred to the hardware checksum accelerator engine; and transmitting, via the at least one egress interface of the network device, the packet with a modified header that includes the checksum.

In still another embodiment, a network device comprises a packet processor configured to i) receive a packet from a network link, the packet including a packet header and a payload and ii) determine at least one egress interface via which the packet is to be transmitted by the network device, and a programmable header alteration processor coupled to a program memory, the programmable header alteration processor configured to execute computer readable instructions stored in the program memory to perform one or more header alteration operations on packet headers of received packets, the programmable header alteration processor being configured to, during processing of a packet header of a received packet, trigger a hardware checksum accelerator engine to calculate a checksum for a bit string corresponding to at least a portion of the packet header. The programmable header alteration processor is configured to partition the bit string into a plurality of segments of the bit string, and transfer the plurality of segment of the bit string to the hardware checksum accelerator engine. The hardware checksum accelerator engine is configured to incrementally calculating the checksum at least by incrementally summing the respective segments, among the plurality of segments of the bit string, transferred to the hardware checksum accelerator engine. The packet processor is further configured cause the packet with a modified header that includes the checksum to be transmitted via the at least one egress interface of the network device.

BRIEF DESCRIPTION OF THE DRAWINGS

FIG. 5 is a block diagram of a header alteration processor of the programmable header alteration engine of FIG. 1, according to an embodiment.

FIGS. 8A-B are diagrams illustrating several example accelerator engine trigger instructions issued by a processor of the packet processing node of FIG. 7, according to embodiment.

DETAILED DESCRIPTION

Figure 1:
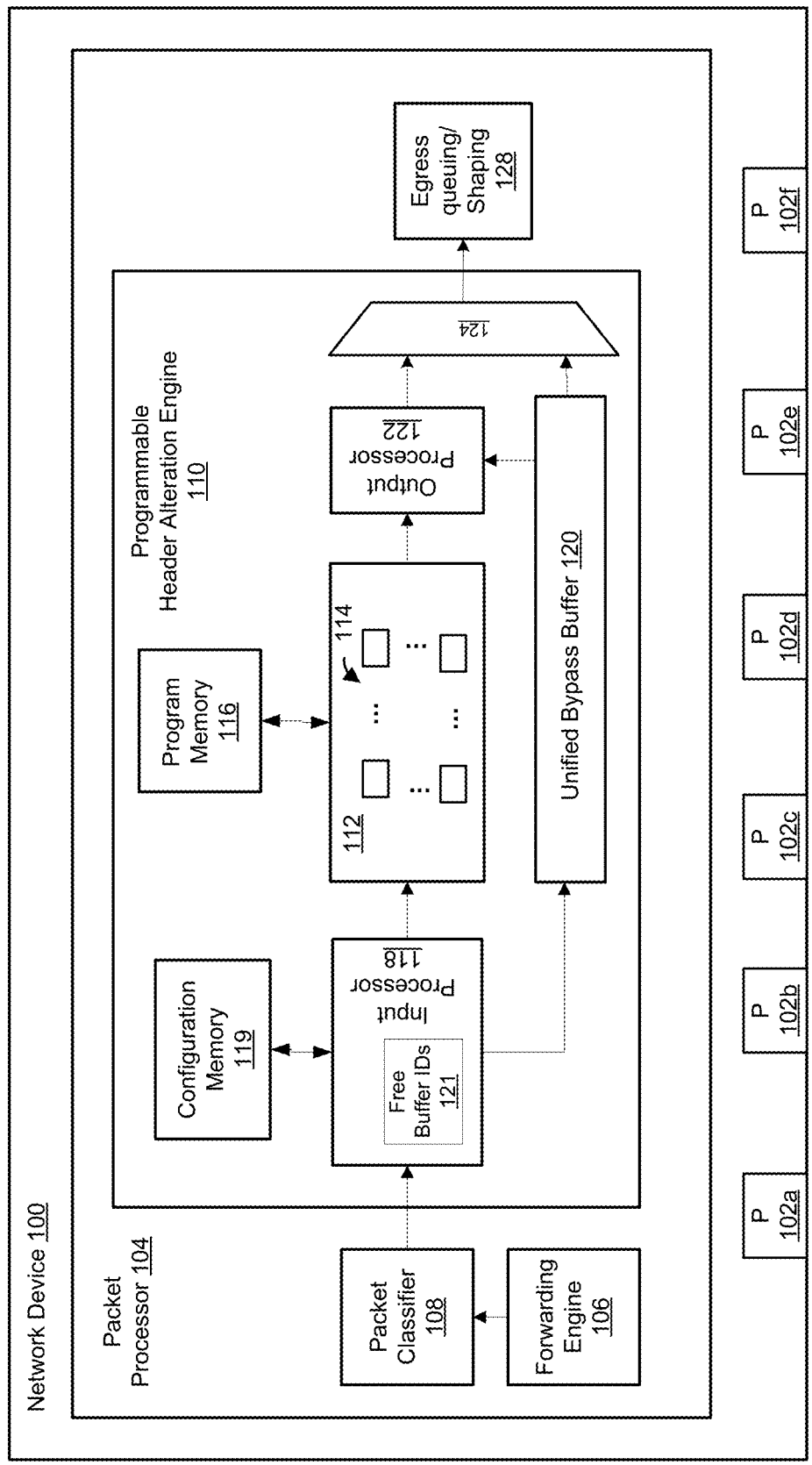
FIG. 1 is a block diagram of an example network device that includes a programmable header alteration engine, according to an embodiment.

In embodiments described below, a network device includes a programmable header alteration engine that includes a programmable header alteration processor coupled to a program memory and configured to implement header alteration operations by executing computer readable instructions stored in the program memory. Generally, because header alteration is performed using a programmable header alteration processor executing computer readable instructions stored in the program memory, the header alteration engine is flexibly programmable/configurable to perform necessary header alteration operations depending, for example, on particular packets being processed and/or particular scenarios of employment of the network device.

In various embodiments described herein, the programmable header alteration engine includes various capabilities that allow the programmable header alteration engine to support header alteration at wire-speed. For example, the programmable header alteration engine includes capability to dynamically bypass header alteration for some packets that may not require header alteration by the programmable header alteration processor, thereby allowing these packets to quickly go through the programmable header alteration engine while also increasing processing power available for processing packets that require header alteration by the programmable header alteration processor, in an embodiment. To quickly and efficiently process packet headers that require header alteration by the programmable header alteration engine, the programmable header alteration engine is configured to perform one or more of i) select one or more portions of a packet header, and provide the selected portions, rather than the entire packet header, to a processor for performing header alteration operations on the packet header, ii) segment the packet headers (or the selected one or more portions of the packet header) so that the one or more portions of the packet header can be efficiently transferred to the processor, iii) identify specific instruction threads for processing the one or more portions of the packet header, and provide an indication of the identified instruction thread to the processor so that execution of the instructions can begin quicker (e.g., immediately) upon receipt of the packet header by the processor, iv) efficiently distribute the packet headers among a plurality of packet processing nodes of the programmable header alteration processor in a manner that allows packets that require processing by relatively slower (e.g., longer) processing threads to not block packets that require processing by relatively faster (e.g., shorter) processing threads, v) to provide packet headers of different packets to different packet processing nodes of the programmable header alteration processor in parallel for concurrent processing of the packet headers, vi) to efficiently trigger external accelerator engines to perform certain processing operations during processing of the packet headers, etc. These and other mechanisms described herein allow the programmable header alteration engine to provide the flexibility of programmable header alteration while also allowing the header alterations to be performed sufficiently quickly, for example to support header alteration at packet wire speed.

FIG. 1 is a simplified block diagram of an example network device 100 configured to utilize packet header alteration techniques of the present disclosure, according to an embodiment. The network device 100 generally forwards packets among two or more computer systems, network segments, subnets, etc. For example, the network device 100 is a router, in one embodiment. It is noted, however, that the network device 100 is not necessarily limited to a particular protocol layer or to a particular networking technology (e.g., Internet Protocol). For instance, in other embodiments, the network device 100 is suitably a bridge, a switch, a virtual private network (VPN) concentrator, etc.

The network device 100 includes a plurality of network interfaces (e.g., ports) 102 configured to couple to respective network links. Although six network interfaces 102 are illustrated in FIG. 1, the network device 100 includes any suitable number of network interfaces 102 in various embodiments. The network device 100 also includes a packet processor 104 coupled to the network interfaces 102. Packets received by the network device 100 are provided by the packet processor 104 for processing of the packets, in an embodiment. In some embodiments, packets are stored in a packet memory (not shown) and data units corresponding to the packets, rather than the packets themselves, are provided to the packet processor 104 for processing of the packets. In some embodiments, portions of the packets, such as packet headers, are provided to the packet processor 104 in addition to or instead of packet descriptors, while remaining portions of the packets are stored in the packet memory. For ease of explanation, the term "packet" is used herein to refer to any combination of a packet itself, a packet header of the packet, and a packet descriptor corresponding to the packet.

Generally speaking, the packet processor 104 is configured to receive and process packets received via ingress network interfaces 102, to determine respective egress network interfaces 102 via which the packets are to be transmitted, and to cause the packets to be transmitted via the determined egress network interfaces 102. In an embodiment, the packet processor 104 includes a forwarding engine 106 and a packet classifier 108. The forwarding engine 106 is configured to analyze header information in packets received via network interfaces 102 to determine network interfaces 102 via which the packets are to be transmitted (referred to herein as "target ports"). As merely an illustrative example, the forwarding engine 106 is configured to use a destination address in a header of a packet to perform a lookup in a forwarding database (not shown), which stores correspondences between destination addresses and network interfaces 102, to determine a particular network interface 102 via which the packet is to be transmitted. As another illustrative example, the forwarding engine 106 is configured to use a VLAN ID in a header of a packet to perform a lookup in a forwarding database (not shown) (e.g. the same forwarding database discussed above or a different forwarding database), which stores correspondences between VLAN IDs and network interfaces 102, to determine a particular set of target network interfaces 102 for the packet. The forwarding engine 106 is configured to store an ID of a target port (or set of multiple target ports) in the packet descriptor corresponding to the packet, according to an embodiment.

The packet classifier 108 is configured to determine to which packet flow a packet belongs by analyzing at least information in a packet header of the packet, according to an embodiment. In some embodiments, the packet classifier 108 is configured to determine to which packet flow a packet belongs by additionally or alternatively analyzing other information associated with the packet, for example an identifier of a network interface 102 via which the packet was received. A packet flow corresponds to packets sharing certain shared characteristics. As one example, some flows, such as Internet Protocol (IP) transmission control protocol (TCP)/user datagram protocol (UDP) flows, are typically defined in the networking industry by a 5-tuple such as {destination IP address, source IP address, L4 Protocol, UDP/TCP destination port, UDP/TCP source port}. As another example, a particular packet flow may be defined as packets with headers having a particular source address and a particular destination address, in an embodiment. In various embodiments, a packet flow may be defined as packets with headers having particular common information such as one or more of i) a particular source address, ii) a particular destination address, iii) a particular virtual local area network (VLAN) identifier (ID), iv) a particular priority, v) a particular packet type, etc. The packet classifier 108 is configured to assign respective flow IDs to at least some packets, where the flow IDs indicate the respective flows to which packets belong, according to an embodiment. The packet classifier 108 is configured to store the flow ID assigned to a packet in the packet descriptor corresponding to the packet, according to an embodiment.

In some embodiments, the packet classifier 108 (or another unit) is configured to additionally determine a type of a packet, for example by analyzing an initial portion of a packet header of the packet and/or and information obtained other than form the packet header, such as, for example, the identifier of the source port via which the packet was received by the network device 100, the identifier of the target port (or set of multiple target ports) via which the packet is to be transmitted by the network device 100, the flow ID assigned to the packet, etc. The packet classifier 108 (or the other unit) determines a packet type of a packet based on one or more of a destination of the packet, a flow to which the packet belongs, an EtherType of the packet, whether the packet is a virtual local area network (VLAN) tagged packet, etc., in various embodiments. The packet classifier 108 (or the other unit) is configured to assign respective packet type IDs to at least some packets, where the packet type IDs indicate the packet types of the packets, according to an embodiment. The packet classifier 108 (or the other unit) is configured to store the packet type ID assigned to a packet in the packet descriptor corresponding to the packet, according to an embodiment.

The packet processor 104 further includes a programmable header alteration engine 110, in an embodiment. The programmable header alteration engine 110 is configured to perform header alteration operations to modify headers of at least some of the packets being processed by the packet processor 104. The header alteration operations performed by the programmable header alteration engine 110 include, for example, setting an explicit congestion notification (ECN) mark in a header of a packet, setting a channelized flow control indication in a header of a packet, inserting or updating a timestamp in a header of a packet, adding a forwarding tag to a header of a packet, removing a forwarding tag from a header of a packet, updating a forwarding tag in a header of a packet, updating a transparent clock correction field in a header of a packet, changing a next hop address in a header of a packet, adding an encapsulating header, removing an encapsulating header, etc., in various embodiments.

The programmable header alteration engine 110 includes a programmable header alteration processor 112. In an embodiment, the programmable header alteration processor 112 includes a packet processing array (PPA) having a plurality of packet processing nodes 114 coupled to a program memory 116. Each packet processing node 114 of the programmable header alteration processor 112 includes a packet header processor (e.g., a small general purpose central processing unit (CPU)) configured to execute computer readable instructions stored in the program memory 116 to perform header alteration operations, in an embodiment. In an embodiment, the small CPU included in each packet processing node 114 is a CPU available from Tensilica (e.g., Xtensa LX5 CPU) or other suitable CPU (e.g., ARC, RISCV, ARM, MIPS, etc.). In an embodiment, the CPU comprises a single instruction interface for reading instructions from a program memory (e.g., the program memory 116), 7 processing pipe stages for implementing the instructions, and a single read/write interface for interacting with a data memory. In an embodiment, the CPU additionally comprises one or more logic control units (LCUs) and several (e.g., 8, 16, 32, etc.) registers, such as 32-bit registers or registers of other suitable sizes. In other embodiments, other suitable CPU architectures are utilized.

In some embodiments, the programmable header alteration engine 110 additionally includes or is coupled to a purely hardware header alteration engine (not shown) configured to perform header alteration operations in hardware. The purely hardware header alteration engine is coupled, for example, to the input of the programmable header alteration engine 110 or the output the programmable header alteration engine 110, in various embodiments. In such embodiments, the purely hardware header alteration engine is hardwired to implement certain header alteration operations, whereas the programmable header alteration processor 110 is configurable to implement other header alteration operations that are not hardwired into the purely hardware header alteration engine.

The programmable header alteration engine 110 also includes an input processor 118, a unified bypass buffer 120, an output processor 122 and a stream merger 124, in an embodiment. The input processor 118 is implement in hardware, in an embodiment, and the input processor 118 is sometimes referred to herein as a "hardware input processor" 118. In an embodiment, the hardware input processor 118 is implemented using one or more integrated circuits configured to operate as described herein. In other embodiments, the input processor 118 is implemented in other suitable manners. The input processor 118 is configured to perform pre-processing of packet headers provided to the programmable header alteration engine 110, in an embodiment. Pre-processing of a packet header includes determining a processing thread identifier (thread ID) that indicates the type of processing that is to be performed with respect to the packet header by the programmable header alteration engine 110, in an embodiment. In an embodiment, the input processor 118 determines the thread ID based on a packet flow with which the packet is associated and/or based on a packet type of the packet. In an embodiment, the input processor 118 is coupled to a configuration memory 119 that stores associations between packet flows and/or packet types and thread IDs, and the input processor 118 is configured to retrieve, header from the configuration memory 119, a thread ID corresponding to a packet based on a packet flow ID associated with the packet and or a packet type ID associated with the packet, in an embodiment. Pre-processing of a packet header also includes making a bypass decision for the packet header to determine whether the packet header is to be provided for processing to the programmable header alteration processor 112 or to bypass processing by the programmable header alteration processor 112, in an embodiment. In an embodiment, the input processor 118 is configured to make the bypass decision based at least in part on a packet flow and/or packet type associated with the packet. In an embodiment, the input processor 118 is configured to make the bypass decision based on at least in part the thread ID obtained for the packet and/or based on other configuration attributes (e.g., statistical attributes) that the input processor 118 may obtain for the packet from the configuration memory 119. In some embodiments, the input processor 118 makes the bypass decision additionally or alternatively based on a congestion state of the programmable header alteration processor 112. An example method implemented by the input processor 118 to make a bypass decision, according to an embodiment, is described in more detail below with reference to FIG. 3.

In an embodiment, when the input processor 118 determines that a packet is a bypass packet for which processing by the programmable header alteration processor 112 is to be bypassed, the input processor writes the packet header to the unified bypass buffer 120. When the input processor 118 determines that a packet is a non-bypass packet that is to be provided to the programmable header alteration processor 112, the input processor 118 provides the packet header to the programmable header alteration processor 112, in an embodiment. In another embodiment, the input processor 118 selects one or more portion of a packet header, and provides the selected one or more portion of the packet header, rather than the entire packet header, to the programmable header alteration processor 112. In some embodiments, the input processor 118 additionally generates metadata corresponding to the packet and provides the metadata along with the selected one or more portions of the packet header to the programmable header alteration processor 112. The metadata includes an identifier of a processing thread (e.g., the thread ID) to be used by the programmable header alteration processor 112 for processing of the packet header, in an embodiment. In some embodiments, the metadata additionally includes other information to be used by the programmable header alteration processor 112 for processing of the packet header. In an embodiment, the metadata is provided to the programmable header alteration processor 112 before the packet header is provided to the programmable header alteration processor 112 to allow a processor of a packet processing node 114 of the programmable header alteration processor 112 to retrieve, from the program memory 116, computer readable instructions corresponding to the identified processing thread based on the indication included in the before receiving the packet header so the processing of the packet header can begin immediately as the packet header is received by the processor, in an embodiment.

The input processor 118 also writes the entire packet header, or at least the remaining portions of the packet header that were not provided to the programmable header alteration processor 112, to the unified bypass buffer 120, in an embodiment. As will be explained in more detail below, after the selected one or more portions of the packet header are processed by the programmable header alteration processor 112, the entire packet header, or at least the portions of the packet header that were not provided to the programmable header alteration processor 112, are retrieved from the unified bypass buffer 120 so that the packet header can be reconstructed, in an embodiment.

In an embodiment, the input processor 118 is configured to write bypass packets in a queue (e.g., a first in first out (FIFO) queue or a linked list queue) in the unified bypass buffer 120. For example, in an embodiment, the input processor 118 is configured to maintain a linked list of bypass packets stored in the unified bypass buffer 120. In operation, when the input processor 118 is to write a bypass packet to the unified bypass buffer 120, the input processor 118 obtains an identifier of a buffer ("buffer ID") from a pool of free buffer IDs 121 maintained by the input processor 118, in an embodiment. The free buffer ID in the pool of free buffer IDs 121 identify free buffer locations in the unified bypass buffer 120, in an embodiment. The input processor 118 then places the buffer ID at the tail of the linked list, and writes the packet header to the identified buffer location in the unified bypass buffer 120, in an embodiment. Because the input processor 118 stores bypass packets in a queue, the programmable header alteration engine 110 maintains the order of the bypass packets, and subsequently outputs the bypass packets in the order in which the packets were received by the programmable header alteration engine 110.

On the other hand, order of non-bypass packets that are provided to the programmable header alteration processor 112 is maintained, as necessary, by the programmable header alteration processor 112, in an embodiment. Accordingly, the input processor 118 need not maintain queues of non-bypass packets in the unified bypass buffer 120. In an embodiment, when the input processor 118 is to write a processing flow packet to the unified bypass buffer 120, the input processor 118 obtains a buffer ID from the pull of free buffer IDs, includes the buffer ID in the metadata generated for the packet, and writes the packet to the identified buffer in the unified bypass buffer 120. Subsequently, when processing of the selected one or more portions of the packet header is completed by the programmable header alteration processor 112, the packet is retrieved from the buffer location indicated by the buffer ID included in the metadata corresponding to the packet, in an embodiment. Because bypass packets are stored in a queue in the unified bypass buffer 120 and the processing flow packets are stored in un-queued buffer locations in the unified bypass buffer 120, the unified bypass buffer 120 acts as a queue buffer (e.g., a FIFO buffer or a linked list buffer) for bypass packets and as a random access memory (RAM) for packets that are processed by the programmable header alteration processor 112, in an embodiment.

With continued reference to FIG. 1, packet headers that are provided to the programmable header alteration processor 112 are distributed among the processing nodes 114 for processing of the packets. In an embodiment, the programmable header alteration processor 112 implements a re-cycling mechanism to distribute packet headers among the processing nodes 114 and to subsequently obtain processed packet headers from the processing nodes 114 so that order within a packet flow is maintained as the packets flow through the programmable header alteration processor 112. In an embodiment, as will be described in more detail below, the re-cycle mechanism allows packet flows that require relatively shorter processing times by the programmable header alteration processor 112 to not be blocked by packet flows requiring relatively longer processing times by the programmable header alteration processor 112 while maintaining packet order within the packet flows.

The output processor 122 is configured to perform post-processing of the packets that are processed by the programmable header alteration processor 112, in an embodiment. The output processor 122 is implement in hardware, in an embodiment, and the output processor 122 is sometimes referred to herein as a "hardware output processor" 122. In an embodiment, the hardware output processor 122 is implemented using one or more integrated circuits configured to operate as described herein. In other embodiments, the output processor 122 is implemented in other suitable manners. In an embodiment, the output processor 122 is configured to perform one or more checks on the processed packets to detect errors that may have resulted from processing of the packets by the programmable header alteration processor 112, in an embodiment. The output processor 122 is configured to retrieve the corresponding packet from the unified bypass buffer 120 and to reconstruct the packet header by incorporating the processed one or more portions of the packet header into the packet header retrieved from the unified bypass buffer 120, in an embodiment.

The stream merger 124 merges packet streams output by the output processor 122 with bypass packet streams retrieved from the unified bypass buffer 120, in an embodiment. The programmable header alteration engine 110 provides the merged flow for further processing of the packets and/or transmission of the packets from the network device 100, in an embodiment. For example, the programmable header alteration engine 110 provides the merged flow to an egress queuing and shaping unit 128 which queues the packets in egress queues corresponding to egress network interfaces 102 via which the packets are to be transmitted, and subsequently causes the packets to be transmitted via the corresponding egress network interfaces 102, in an embodiment.

Generally, because the programmable header alteration engine 110 is configured to perform header alteration functions using processors executing computer readable instructions, the header alteration 110 is flexibly configurable to perform necessary header alteration operations with respect to various packets being processed by the network device 100, for example, at least compared to systems in which packet header alteration is implemented entirely in hardware, in at least some embodiments. Further, in various embodiments, the programmable header alteration engine 110 includes various capabilities described herein that allow the programmable header alteration engine 110 to provide this flexibility while performing the necessary header alterations sufficiently quickly, for example to support packet wire speed, in various embodiments.

Figure 2:
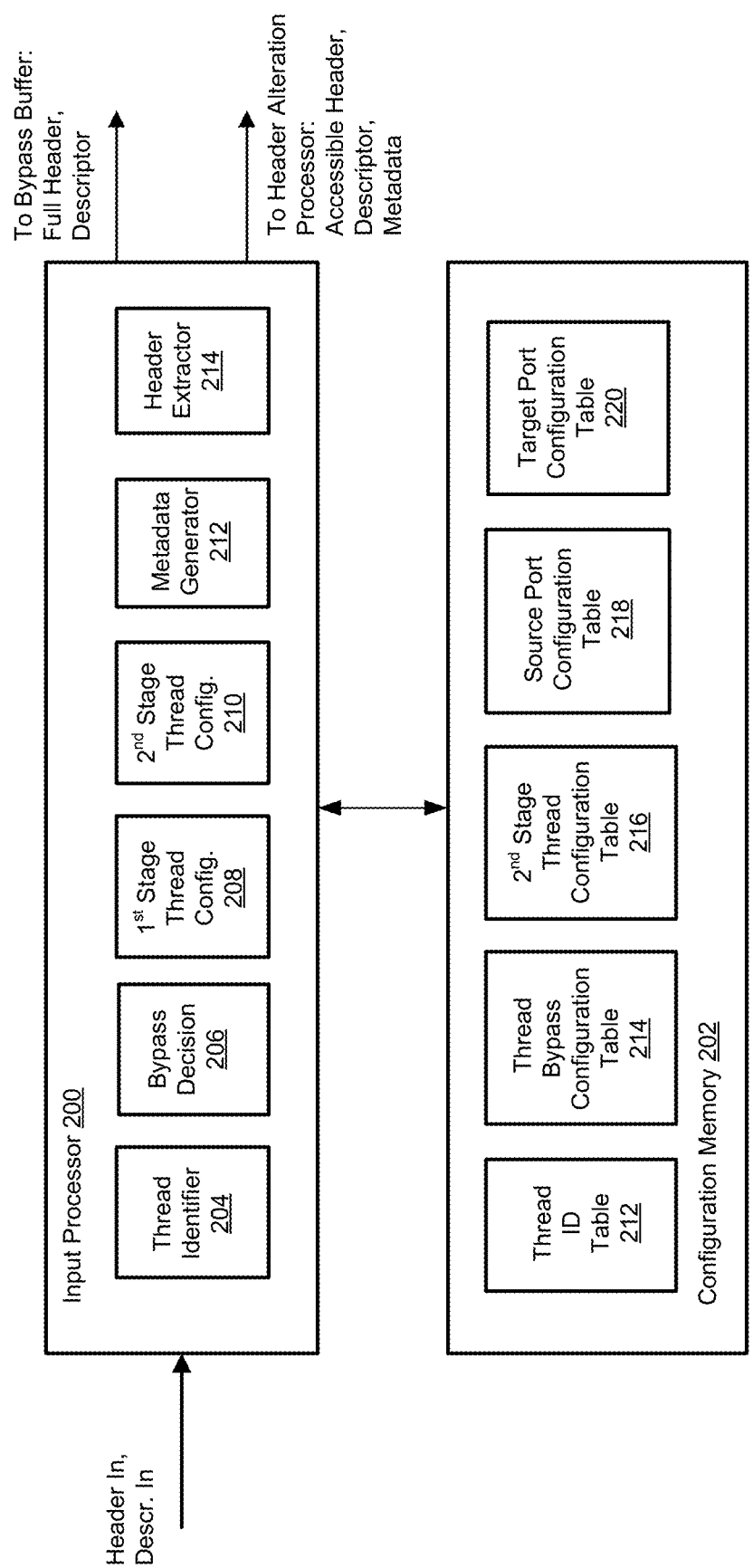
FIG. 2 is a block diagram of an input processing unit of the programmable header alteration engine of the network device of FIG. 1, according to an embodiment.

FIG. 2 is a block diagram of an input processor 200 suitable for use with a programmable header alteration engine of a network device, according to an embodiment. In an embodiment, the input processor 200 corresponds to the input processor 118 of the programmable header alteration engine 110 of the network device 100 of FIG. 1. For exemplary purposes, the input processor 200 is described below with reference to the programmable header alteration engine 110 of the network device 100 of FIG. 1. However, the input processor 200 is used with header alteration engines different from the programmable header alteration engine 110 and/or with network devices different from the network device 100, in other embodiments.

The input processor 200 includes a thread identifier 204. The thread identifier 204 is configured to determine a thread ID for a packet header based at least in part on a flow and/or a type of the packet. In an embodiment, the thread identifier 204 is configured to access a thread ID table 212 stored in a memory 210, and to obtain a thread ID for the packet from the thread ID table 212. In an embodiment, the thread identifier 204 is configured to identify an entry in the thread ID table 212 based on one of, or a combination of two or more of, i) a source port of a packet, ii) a target port of the packet, iii) a flow of the packet, iv) a packet type, etc., and to retrieve a thread ID from the identified entry in the thread ID table 212.

The input processor 200 also includes a bypass decision unit 206 configured to determine whether the packet is to be provided via a processing path to the programmable header alteration processor 112 or to be diverted to a bypass path that bypasses the programmable header alteration processor 112, in an embodiment.

Figure 3:
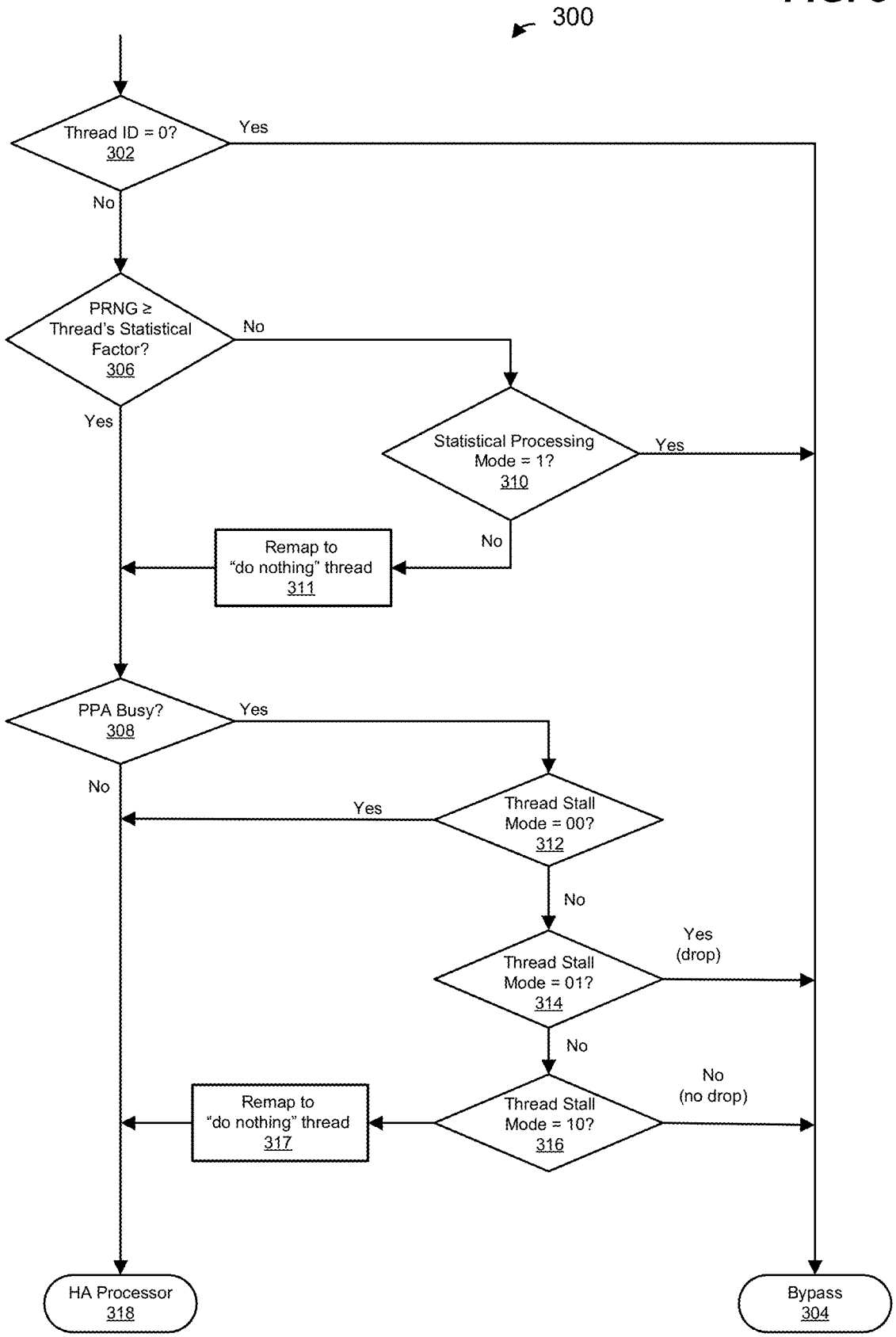
FIG. 3 is a flow diagram of a method for determining whether a packet is to bypass header alteration by the programmable header alteration engine of FIG. 1, according to an embodiment.

FIG. 3 is a flow diagram of a method 300 for determining whether a packet is to be provided via a processing path to a programmable header alteration processor or to be diverted to a bypass path that bypasses the header alteration processor, according to an embodiment. In an embodiment, the method 300 is implemented by the input processing unit 200 of FIG. 2. For example, at least a portion of the method 300 is performed by the bypass decision engine 206 of the input processing unit 200 of FIG. 2, in an embodiment. For ease of explanation, the method 300 is described with reference to the input processing unit 200 of FIG. 2. However, the method 300 is implemented by a suitable processing unit different from the input processing unit 200 of FIG. 2, in some embodiments.

At block 302, the input processor 200 (e.g., the bypass decision engine 206) determines whether the thread ID associated with the packet indicates that the packet belongs to a bypass flow that is to bypass the programmable header alteration processor 112. For example, the bypass decision engine 206 checks whether the tread ID associated with the packet is equal to a particular value (e.g., thread ID=0) that indicates that the packet belongs to a bypass flow. If the bypass decision engine 206 determines at block 302 that packet belongs a bypass flow, then the method 300 terminates at block 304 with a decision that the packet is to bypass the programmable header alteration processor 112.

On the other hand, if the bypass decision engine 206 determines at block 302 that the packet belongs to a processing flow, then the input processor 200 (e.g., the first stage thread configuration unit 208) obtains further bypass configuration information, and the bypass decision engine 206 proceeds to further determine whether the packet is to be diverted to the bypass path on the bypass configuration information, in an embodiment. To obtain the further bypass configuration information, in an embodiment, the first stage thread configuration unit 208 accesses a bypass thread configuration table 214 in the memory 202 based on the thread ID associated with the packet, and retrieves from the bypass thread configuration table 214 one or more bypass attributes configured for the corresponding processing thread, such as i) a statistical factor configured for the corresponding processing thread, ii) a statistical processing mode configured for the corresponding processing thread and iii) a stall mode configured for the corresponding processing thread, in an embodiment.

The method 300 then proceeds to block 306, at which the bypass decision engine 206 obtains (e.g., from a pseudorandom number generator included in or coupled to the bypass decision engine 206) a pseudorandom-generated number (PRGN), and compares the PRGN with the statistical factor of the corresponding processing thread. Based on the comparison between the PRGN and the statistical factor of the corresponding processing thread, the bypass decision engine 206 determines whether the packet is to be statistically selected to bypass the programmable header alteration processor 112. For example, if the bypass decision engine 206 determines at block 306 that PRGN is greater than or equal to the statistical factor of the corresponding processing thread, this indicates that the packet is to be statistically selected for header alteration by the programmable header alteration processor 112, and the method 300 proceeds to block 308, in an embodiment. On the other hand, if the bypass decision engine 206 determines at block 306 that PRGN is less than the statistical factor of the corresponding processing thread, this indicates that the packet is to be statistically selected to bypass the programmable header alteration processor 112, and the method 300 continues at block 310, in an embodiment.

At block 310, the bypass decision engine 206 determines whether statistical processing mode is enabled for the corresponding processing thread based on the statistical processing mode configured for the corresponding processing thread. If the bypass decision engine 206 determines at block 310 that the statistical processing mode is enabled for the corresponding processing thread (e.g., if the statistical processing mode is set to a logic 1), then the method 300 terminates at the bypass block 304 thereby statistically diverting the packet to the bypass path. On the other hand, if the bypass decision engine 206 determines at block 310 that statistical processing mode is not enabled for the corresponding processing thread (e.g., if the statistical processing mode is set to a logic 0), then the bypass decision engine 206 does not statistically select the packet to be diverted to the bypass path, and the method 300 proceeds to a block 311 at which the thread ID corresponding to the packet is remapped to a "do nothing" thread, in an embodiment. The method 300 then returns to block 308, in an embodiment.

At block 308, the bypass decision engine 206 determines a congestion level of the programmable header alteration processor 112. In an embodiment, the bypass decision engine 206 determines the congestion level based on a feedback signal (e.g., a back-pressure signal) from the programmable header alteration processor 112. If the bypass decision engine 206 determines that the programmable header alteration processor 112 is not busy or that the congestion level of the programmable header alteration processor 112 is sufficiently low, then the method 300 terminates at block 318 with a decision to provide the packet to the programmable header alteration processor 112. On the hand, if the bypass decision engine 206 determines that the programmable header alteration processor 112 is busy or that the congestion level of the programmable header alteration processor 112 is not sufficiently low, then the method 300 proceeds to blocks 312-316 at which further determinations are made to determine whether or not the packet is to bypass the programmable header alteration processor 112, in an embodiment.

At block 312, the bypass decision engine 206 determines, based on the stall mode configured for the corresponding processing thread, whether the processing thread allows packets to bypass header alteration if the programmable header alteration processor 112 is busy. If the bypass decision engine 206 determines at block 312 that the processing thread does not allow packets to bypass header alteration (e.g., if thread stall mode ID is set to a logic 00), then the method 300 terminates at block 318 with the decision that the packet is to be provided to the programmable header alteration processor 112. On the other hand, if the bypass decision engine 206 determines at block 312 that the processing thread allows packets to bypass header alteration processing (e.g., if thread stall mode ID is not set to a logic 00), then the method 300 proceeds to block 314 at which the bypass decision engine 206 determines, based on the stall mode of the processing thread, whether the processing thread allows packets that bypass processing by the programmable header alteration processor 112 are to be dropped by the network device 100. If the bypass decision engine 206 determines at block 314 that the stall mode of the processing thread indicates that packets associated with the processing thread that do not undergo header alteration by the programmable header alteration processor 112 are to be dropped by the network device 100, then the method 300 terminates at the bypass block 304 with an indication that the packet subsequently is to be dropped by the network device 100.

On the other hand, if the bypass decision engine 206 determines at block 314 that the stall mode of the processing thread indicates that packets associated with the processing thread that do not undergo processing by the programmable header alteration processor 112 are not to be dropped by the network device 100, then the method 300 proceeds to block 316 at which the bypass decision engine 206 determines whether the stall mode of the processing thread indicates that packets that do not undergo processing by the programmable header alteration processor 112 i) are nonetheless to be provided to the programmable header alteration processor 112 to maintain proper order of packets associated with the processing thread as the packet flow through the programmable header alteration engine 110 or ii) are to be redirected to the bypass path and not provided to the programmable header alteration processor 112. If it is determined at block 316 that the packet is nonetheless to be provided to the programmable header alteration processor 112, then the method 300 proceeds to block 317 at which the thread ID corresponding to the packet is remapped to a "do nothing" thread, in an embodiment. The packet method 300 then terminates at block 318 with the decision to provide the packet to the programmable header alteration processor 112 so that the packet flows through the programmable header alteration processor 112 without being processed by the programmable header alteration processor 112, in an embodiment. On the other hand, if it is determined at block 316 that the packet is to be redirected to the bypass path and not provided to the programmable header alteration processor 112, then the method 300 terminates with the bypass decision at block 304 thereby redirecting the packet to the bypass path.

Referring again to FIG. 2, the input processor 200 also includes a second stage configuration unit 210, a metadata generator 212 and a header extractor 214 configured to perform addition pre-processing operations with respect to packets that are not to bypass processing by the programmable header alteration processor 112, in an embodiment. The second stage configuration unit 210 is configured to access a second stage thread configuration table 216 in the memory 202 based on the thread ID corresponding to the packet, and obtain thread configuration information to be used for processing of the packet by the programmable header alteration processor 112, in an embodiment. Additionally or alternatively, the second stage configuration unit 210 is configured to access a source port configuration table 218 based on an indicator of a source port at which the packet was received and/or a target port configuration table 220 based on an indicator of a target port via which the packet is to be transmitted to obtain configuration information to be used by the programmable header alteration processor 112 for processing packets received via the source port and/or to be transmitted via the target port, in an embodiment. In other embodiments, other suitable configuration information is obtained by the second stage configuration unit 210. The metadata generator 212 is configured to generate metadata for the packet to include at least the configuration information obtained by the second stage configuration unit 210, in an embodiment.

Figure 4A:
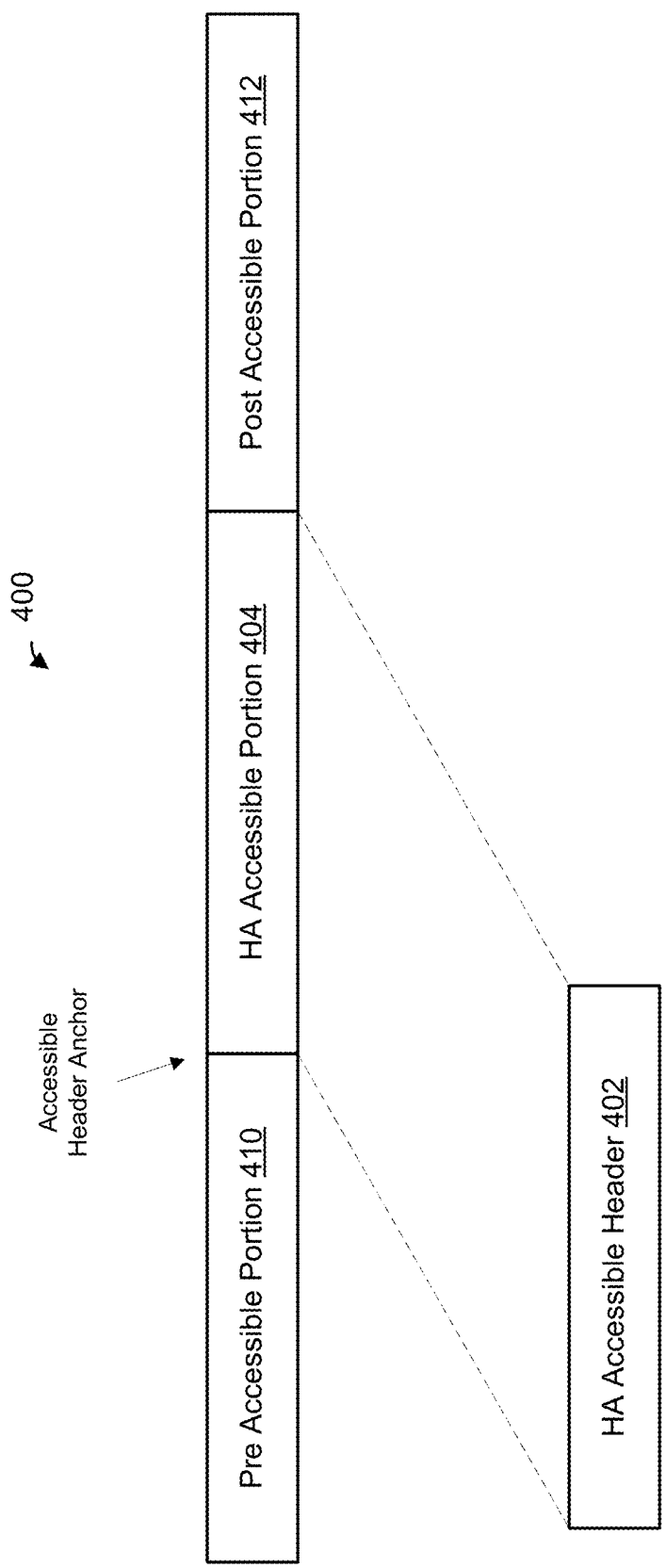
FIG. 4A is a diagram illustrating a process performed by the programmable header alteration engine of FIG. 1 to extract a header alteration processor accessible header from a packet header, acceding to an embodiment.
Figure 4B:
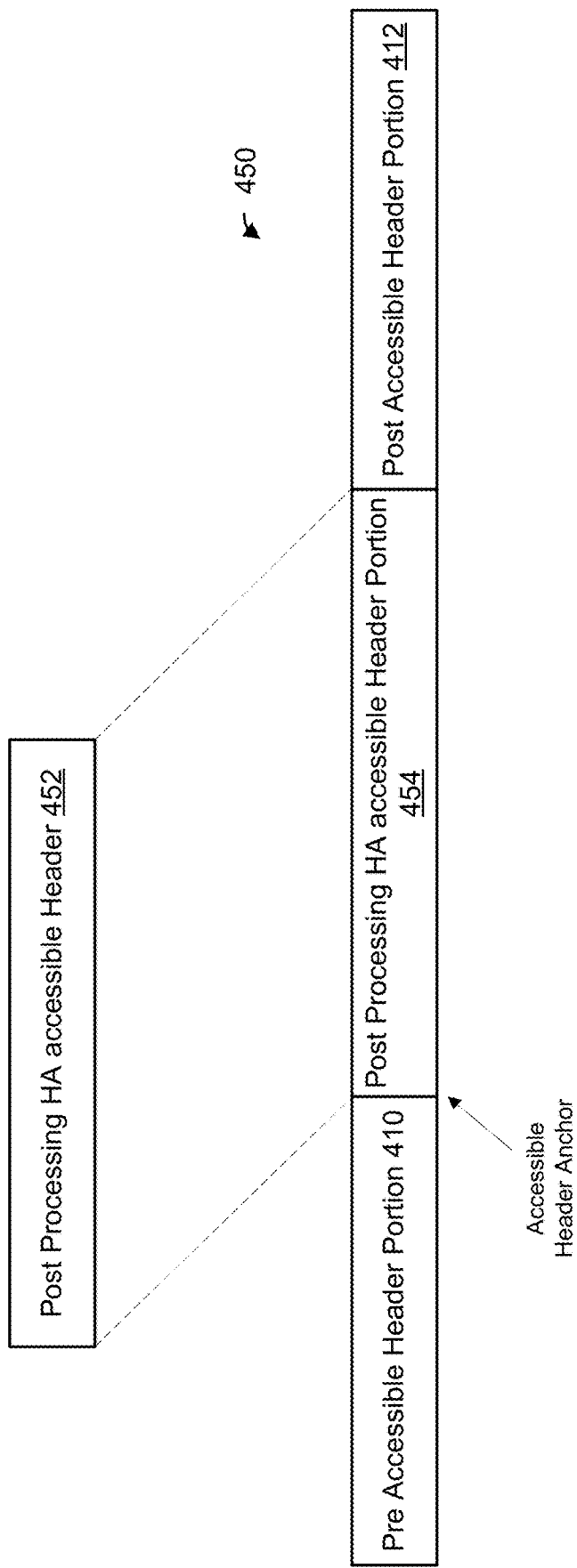
FIG. 4B is a diagram of a process performed to generate a processed packet header after a header alteration accessible header is processed by the programmable header alteration engine of FIG. 1, according to an embodiment.

The header extractor 214 is configured to extract one or more portions of a packet header of the packet, and to generate an alteration processor accessible header to include the one or more portions extracted from the packet header, in an embodiment. FIGS. 4A-B are diagrams illustrating, respectively, extraction of one or more portions of a packet header 400 to generate an alteration processor accessible header 402, and generation of a processed packet header 450 after the alteration processor accessible header 400 is processed by the programmable header alteration processor 112, according to an embodiment. In an embodiment, the packet header 400 corresponds to an unaltered header of a received packet being processed by the network device 100. In another embodiment, in which the programmable header alteration engine 110 is preceded by a purely hardware header alteration engine coupled to the input of the programmable header alteration engine 110, the packet header 400 corresponds to a packet header, of a received packet, that is altered by the purely hardware header alteration engine, in at least some scenarios, in an embodiment. Referring to FIGS. 1 and 2, the input processor 118 (e.g., the header extractor 208 in FIG. 2) generates the alteration processor accessible header 402, and the output processor 122 subsequently generates the processed packet header 450 after the alteration processor accessible header 402 is processed by the programmable header alteration processor 112, according to an embodiment. By way of example, the alteration processor accessible header extraction and processed header generation illustrated in FIGS. 4A-B are described in the context of the network device 100 of FIG. 1. In other embodiments, the alteration processor accessible header extraction and processed header generation illustrated in FIGS. 4A-B are performed by network devices different from the network device 100 of FIG. 1.

In an embodiment, the input processor 118 identifies an alteration processor accessible header portion 404 to be extracted from the packet header 400 based on an accessible header anchor 406 that indicates a beginning location (e.g., a first bit) and a length of the single portion to be extracted from the packet header 400, according to an embodiment. In an embodiment, the accessible header anchor 406 is associated with a processing thread that is to be used to process the packet header 400. In an embodiment, the input processor 118 obtains the accessible header anchor 406 from the configuration memory 116 based on the thread ID (e.g., determined by the thread identifier 204 of FIG. 2) associated with packet header 400. The input processor 118 extracts the alteration processor accessible header portion 404 beginning at the location indicated by the accessible header anchor 406 and of the length indicated by the accessible header anchor 406, and generates the alteration processor accessible header 402 to include the alteration processor accessible header portion 404 extracted from the packet header 400, in an embodiment.

The input processor 118 provides the alteration processor accessible header 402 to the programmable header alteration processor 112 for processing, in an embodiment. Additionally, the input processor 118 stores the entire packet header 400, in the unified bypass buffer 120, in an embodiment. In another embodiment, the input processor 118 stores a pre-accessible header portion 410 and a post accessible header portion 412 of the packet header 412, rather than the entire packet header 400, in the unified bypass buffer 120.

Referring now to FIG. 4B, the programmable header alteration processor 112 processes the alteration processor accessible header 402 to generate a post-processing alteration processor accessible header 454, in an embodiment. The post-processing alteration processor accessible header 452 comprises the alteration processor accessible header 404 altered in accordance with the processing thread with which the packet header 400 is associated, in an embodiment. The post-processing alteration processor accessible header 452 is provided to the output processor 112, and the output processor 112 generates the processed packet header 450 by incorporating the post-processing alteration processor accessible header 454 into the packet header 400, in an embodiment. For example, the output processor 122 retrieves the entire packet header 400 from the unified bypass buffer 120, and replaces the alteration processor accessible header portion 404 with the post-processing alteration processor accessible header 454, in an embodiment. In another embodiment, the output processor 112 retrieves the pre accessible header portion 410 and the post accessible header portion 412 from the unified bypass buffer 120, and generates the processed packet header 450 by properly combining the pre accessible header portion 410 and the post accessible header portion 412 with the post-processing alteration processor accessible header 454.

With continued reference to FIGS. 4A-B, although that alteration processor accessible header 402 is illustrated in FIG. 4A as including only a single alteration processor accessible header portion 404 extracted from the packet header 400, the alteration processor accessible header 402 includes multiple alteration processor accessible portions 404 extracted from the packet header 400, in other embodiments. At least some of the multiple alteration processor accessible portions 404 are non-contiguous portions of the packet header 400, in an embodiment. For example, the input processor 118 obtains (e.g., based on a thread ID associated with the packet header 400) multiple accessible header anchors 406, where respective ones of the multiple accessible header anchors indicate respective beginning locations and lengths of respective ones of multiple (e.g., non-contiguous) alteration processor accessible portions 404 to be included in the alteration processor accessible header 402. The input processor 118 then extracts the multiple alteration processor accessible portions 404 from the packet header 400, and generates the alteration processor accessible header 402 to include the multiple alteration processor accessible portions 402 extracted from the packet header 400, in an embodiment. The programmable header alteration processor 112 processes the alteration processor accessible header 402 to generate post processing alteration processor accessible header 452 that includes multiple post processing alteration processor accessible header portions, in an embodiment. The output processor 122 then generates the processed packet header 450 by properly incorporating the multiple post-processing alteration processor accessible header portions included in the post processing alteration processor accessible header 452 into respective post processing alteration processor accessible header portions 454 of the processed packet header 450, in an embodiment.

In some embodiments, in which the programmable header alteration engine 110 is followed by a purely hardware header alteration engine, the purely hardware header alteration engine then operates on the processed packet header 450 to implement one or more additional header alteration operations on the processed packet header 450.

FIG. 5 is a block diagram of a programmable header alteration processor 500, according to an embodiment. In an embodiment, the programmable header alteration processor 500 corresponds to the programmable header alteration processor 112 of the network device 100 of FIG. 1, and the programmable header alteration processor 500 is described in the context of the network device 100 of FIG. 1 for explanatory purposes. In other embodiments, however, the programmable header alteration processor 500 is used with another suitable network device other than the network device 100 of FIG. 1.

The programmable header alteration processor 500 is configured to receive packet headers from the input processor 118, and to implement corresponding processing threads to process the packet headers. In an embodiment, the programmable header alteration processor 500 receives alteration processor accessible headers (e.g., the alteration processor accessible header 402 of FIG. 4A) extracted from packet headers, rather than the entire packet headers, and processes the alteration processor accessible headers. For ease of explanation, the term "packet header" is used herein to refer to a packet header or an alteration processor accessible header extracted from the packet header.

The programmable header alteration processor 500 includes a plurality of packet processing nodes (PPNs) 502 coupled to a memory 504 and configured to implement computer readable instructions stored in the memory 504. The PPNs 502 are arranged in packet processing node groups 506, in the illustrated embodiment. PPNs 502 of a packet processing node group 506 share certain resources, in an embodiment. For example, although only a single memory 504 is illustrated in FIG. 5, PPNs 502 of respective groups 506 are coupled to respective memories 504, in some embodiments.

The programmable header alteration processor 500 also includes a distributor 508 configured to distribute packet headers among the packet processing nodes 502 for processing of the packet headers, in an embodiment. The distributor 508 generally operates by distributing packet headers to the PPNs 502 in the order in which the packet headers are received by the distributor 508, by cycling through the PPNs 502. In an embodiment, the distributor 508 distributes packet headers to PPNs according to a distribution scheme that allows for packet headers associated with processing threads that require relatively shorter processing times by the PPNs 502 to not be blocked or delayed by packet headers associated with processing threads that require relatively longer processing times by the PPNs 502. According to the distribution scheme, the distributor 508 distributes the packet headers by cycling through the PPNs 502 in accordance with re-cycle numbers assigned to processing threads that are to be used for processing of the packet headers, with smaller re-cycle numbers (e.g., re-cycle number of 1) being assigned to processing threads with relatively shorter processing times and larger re-cycle numbers (e.g., re-cycle number of 2, 3, 4, etc.) assigned to processing threads with relatively longer processing threads. When the distributor 508 cycles through the PPNs 502, the distributor 508 skips a PPN 502 during one or more cycles in accordance with a re-cycle number assigned to a processing thread that is being implemented by the PPN 502, if the re-cycle number is greater than 1, in an embodiment. Thus, for example, when a packet header is associated with a processing thread with a re-cycle number of 2 is distributed to a particular PPN, the distributor 508 skips over the particular PPN during the next distribution cycle, in an embodiment. Accordingly, during the next distribution cycle, instead of distributing a packet header to the particular PPN, the distributor 508 distributes the packet header to another PPN 502 that is available for processing of the packet header, thereby avoiding blocking of the packet header by the relatively longer processing time of the processing thread being implemented by the particular PPN 502, in an embodiment.

In an embodiment, in addition to a packet header distributed to a PPN 502, the distributor 508 also provides a packet descriptor associated with the corresponding packet and metadata generated by the input processor 118, in an embodiment. The programmable header alteration processor 500 also includes a plurality of splitters 510 configured to break up packet headers, packet descriptors and metadata to be provided to a PPN 502 into chunks so that the information is transferred to the PPN 502 in chunks, in an embodiment. Transferring information to PPNs 502 in chunks is performed using suitable narrow interfaces (e.g., busses) between the splitters 510 and the PPNs 502 while still allowing for transfer of relatively large amounts of header information (e.g., selected header portion) and metadata corresponding to a packet header. The respective chunks of information, including e.g., a packet header, a packet descriptor and metadata, associated with a packet, are of a size that corresponds to, or is narrower than, an interface (e.g., a bus) between the splitter 510 and the PPN 502, in an embodiment. For example, a bit stream of information that includes metadata corresponding to a packet, the packet header, and the packet descriptor is broken up into chunks as the bit stream enters the splitter 510, where each chunk corresponds to or is narrower than the interface (e.g., the bus) between the splitter 510 and the PPN 502, in an embodiment. Transferring information to PPNs 502 in chunks also allows the chunks of information corresponding to a packet to be transferred to a PPN 502 concurrently with chunks of information already processed by the PPN 502 (e.g., chunks of a packet header, a packet descriptor, metadata, etc. corresponding to a previous previous packet header processed by the PPN 502) is transferred out from the PPN 502, in an embodiment.

Although only a single splitter corresponding to each PPN group 506 is illustrated in FIG. 5, the programmable header alteration processor 500 includes multiple splitters 510 corresponding to each of the packet processing node groups 506, in some embodiments. Respective ones of the splitters 510 operate in parallel to break up and transfer packet headers, packet descriptors, and metadata, to different ones of the PPNs 502, in an embodiment. In an embodiment, each particular splitter 510, at any given time, operates on a packet header, packet descriptor, and metadata corresponding to a particular packet, and generates chunks of the packet header, packet descriptor, and metadata corresponding to the particular packet. The chunks generated by the splitter 510 are provided to a particular PPN 502 for processing of the particular header, in an embodiment. In this manner, in an embodiment, chunks of information (packet header, packet descriptor, and metadata) corresponding to a particular packet are transferred to a particular PPN serially, enabling the transfer of relatively large among of information via a suitably narrow communication bus, in an embodiment. On the other hand, chunks of information (packet header, packet descriptor, and metadata) corresponding to different packets are transferred to different PPNs 102 in parallel, in an embodiment.

In an embodiment, a splitter 510 causes at least a portion of metadata corresponding to a packet header to be transferred to a PPN 502 prior to transferring corresponding header information to the PPN 502. For example, an initial chunk (e.g., the first chunk) corresponding to a packet header transferred from the splitter 610 to the PPN 502 includes at least the portion of the metadata, in an embodiment. The at least the portion of the metadata transferred to the PPN 502 includes a thread ID associated with the packet header, or other indicator of a processing thread that is to be used by the PPN 502 to process the packet header, such as a pointer to a memory location at which a beginning of the processing thread is stored in the memory 504, in an embodiment. Accordingly, the PPN 502 receives the thread ID or other the indicator of the processing thread prior to receiving the header information that is to be processed using the processing thread, in an embodiment. In an embodiment, the PPN 502 retrieves at least initial instructions corresponding to the processing thread from the memory 504 prior to receiving the header information. The PPN 502 then begins implementing the processing thread immediately upon receiving the header information, in an embodiment. In an embodiment, the PPN 502 begins implementing the processing thread immediately upon receiving a first chunk that includes header information.

The programmable header alteration processor 500 also includes a plurality of accumulators 512 and an aggregator 514. Chunks of packet headers that are processed by a PPN 502 are transferred to an accumulator 512 that assembles the chunks, in an embodiment. Although only a single accumulator 512 corresponding to each packet processing node group 506 is illustrated in FIG. 5, the programmable header alteration processor 500 generally includes multiple accumulators 512 corresponding to each of the packet processing node groups 506, in an embodiment. Respective ones of accumulators 510 operate in parallel to receive and assemble processed header chunks from different ones of the PPNs 502, in an embodiment.

The aggregator 514 aggregates packet headers distributed to the PPN 502 into processed packet header streams, in an embodiment. To maintain the order of packet headers processed by the PPNs 502 as the packet headers go through the programmable header alteration processor 500, the aggregator 514 utilizes an aggregation scheme that corresponds to the distribution scheme used by the distributor 506, in an embodiment. According to the aggregation scheme, the aggregator 514 aggregates the packet headers by cycling through the PPNs 502 in accordance with the re-cycle numbers that were used by the distributor 506 to distribute the packet headers. Thus, when the aggregator 514 cycles through the PPNs 502, the aggregator 514 skips a PPN 502 during one or more cycles in accordance with a re-cycle number that was used by the distributor 506 when distributing the packet headers, thereby maintaining the order of the packet headers, in an embodiment.

The programmable header alteration processor 500 operates on a faster clock than a core clock used to operate the remainder of the packet processor 104, including components of the programmable header alteration engine 110 other than the programmable header alteration processor 500. Accordingly, the header alteration processor 500 includes an input synchronization component, such as a sync FIFO 520, and an output synchronization component, such as a sync FIFO 522, to synchronize between the two clock domains, in an embodiment. Operating the programmable header alteration processor 500 on a faster clock relative to the core clock allows the programmable header alteration processor 500 to implement relatively longer processing threads to perform header alteration for packets flowing through the packet processor 110 without slowing down the traffic flowing through the packet processor 110 in at least some situations, in an embodiment.

With continued reference to FIG. 5, during processing of the packet headers, PPNs 502 engage one or more hardware accelerator engines 530 to perform specific processing operations on the packet headers, in an embodiment. Although a single set of hardware accelerator engines 530 shared by the PPNs 502, the programmable header alteration processor 500 includes multiple sets of header alteration 530, in some embodiments. For example, each PPN 502 includes a respective set of hardware accelerator engines 530 implemented in hardware, in an embodiment. In an embodiment, the hardware accelerator engines 530 are implemented using one or more integrated circuits configured to operate as described herein. In other embodiments, the hardware accelerator engines 530 are implemented in other suitable manners.

The one or more hardware accelerator engines 530 are configured to perform respective specific operations that would take significantly longer (e.g., twice as long, four times as long, one hundred times as long, etc.) to be performed via computer readable instructions, in an embodiment. For example, the one or more hardware accelerator engines 530 are configured to perform respective information shifting operation to shift fields in packet headers, for example for insertion of tags into the packet headers and/or for removal of tags from the packet headers. As a more specific example, in an embodiment, the one or more hardware accelerator engines 530 include a bit shift operation accelerator engine 530-1 configured to shift fields in the packet headers by given numbers of bits, and a byte shift operation accelerator engine 530-2 configured to shift fields in packet headers by given numbers of bytes, in an embodiment. As another example, the accelerator engine 530 include a checksum accelerator engine 530-3 that is configured to calculate an incremental update to a checksum field of a packet header, in an embodiment. In other embodiments, the accelerator engines 530 additionally or alternatively include accelerator engines 530 configured to perform other suitable operations. In at least some embodiments, engaging hardware accelerator engines 530 to perform the processing operations allows a PPN 502, for example, more quickly insert a tag (e.g., a forwarding tag) into packet header and/or to more quickly strip a tag (e.g., a forwarding tag) from a packet header as compared to an implementation in which a processor executing computer readable instructions does not engage hardware engines to perform the operations (e.g., the information shifting operations). In at least some embodiments, engaging hardware accelerator engines 502 to perform the processing operations permits the PPN 502 to perform header alteration processing of packet headers at full-wire speed at which the network device 100 receives packets.

As discussed above, in an embodiment, the checksum accelerator engine 530-3 is configured to calculate an incremental update to a checksum field of a packet header, in an embodiment. In an embodiment, a PPN 502 that is processing a packet header of a packet is configured to trigger the checksum accelerator engine 530-3 to calculate a checksum based on a bit string extracted to from the packet header. The bit string corresponds to a particular portion of the packet header, depending, for example, on the type of packet to which the packet header corresponds, in an embodiment. As an example, in an embodiment and/or scenario, the bit string corresponds to an IP header, such as an IPv4 or an IPv6 header, included in the packet header, in an embodiment. In this case, the PPN 502 triggers the checksum accelerator engine 530-3 to generate a checksum to be included in a checksum field of the IP header, in an embodiment. As another example, in another embodiment and/or scenario, the bit string corresponds to a UDP header included in the packet header, and the PPN 502 triggers the checksum accelerator engine 530-3 to generate a checksum to be included in a checksum field of the UDP header. As yet another example, in another embodiment and/or scenario, the bit string corresponds to a generic UDP encapsulation (GUE) header included in the packet header, and the PPN 502 triggers the checksum accelerator engine 530-3 to generate a checksum to be included in a checksum field of the GUE header. In other embodiments, the bit string corresponds to other suitable portions of the header.

In an embodiment, to trigger the checksum accelerator engine 530-3, the PPN 502 is configured to partition the bit string into a plurality of segments, and to generate respective trigger instructions to serially transfer respective ones of the segments to the checksum accelerator engine 530-3. As an example, the PPN 502 is configured to partition the bit string into up to four segments, each segment comprising 16 bits, and to generate respective trigger instructions to serially transfer respective ones of the 16-bit segments to the checksum accelerator engine 530-3. In other embodiments, other suitable numbers of segments and/or segments of other suitable sizes are utilized. The checksum accelerator engine 530-3 is configured to add the respective segments to each other in stages, and to accumulate the calculated sum, in an embodiment. For example, the checksum accelerator engine 530-3 includes one or more adders (e.g., serial adders, such as 16-bit serial adders) and an accumulator, in an embodiment. The one or more adders are configured to incrementally determine a sum of the respective segments in multiple summation stages by providing a sum generated in each stage to the accumulator, and subsequently summing a subsequent one of the segments with the current sum in the accumulator, in an embodiment. In at least some embodiments, because respective segments of a bit string are serially transferred to the checksum accelerator engine 530-3 and are used to incrementally generate a checksum by the checksum accelerator engine 530-3, a smaller checksum accelerator engine 530-3, in terms of size, power consumption, etc., can be used as compared to a system in which an entire bit string is provided in a same clock cycle to a checksum engine, particularly when relatively long bit strings need checksum calculation.

In some embodiments, the checksum accelerator engine 530-3 is configured to wrap one or more "carry" in the sum generating by a calculation in an adder into the accumulator in a same clock cycle in which the calculation is performed, thereby eliminating the need to perform a final wrap-around operation after the checksum calculation is completed, in an embodiment. When the checksum accelerator engine 530-3 completes generation of the checksum, the checksum accelerator engine 530-3 outputs the checksum, for example by providing the checksum back to the PPN 502 or by writing the checksum to a memory location indicated by the PPN 502. In an embodiment, the PPN 502 is configured to provide, to the checksum accelerator engine 530-3, an indicator (e.g., a destination pointer) of a memory location (e.g., in a packet register file) to which the calculated checksum is to be written. For example, the PPN 502 is configured to include the indicator in one or more trigger instructions that are used to transfer the respective segments to the checksum accelerator engine 530-3, in an embodiment. When the checksum calculation is completed by the checksum accelerator engine 530-3, the PPN 502 writes the checksum to the indicated memory location, thereby placing the calculated checksum into an appropriate checksum field in the packet header, in an embodiments.

In some embodiments, the checksum accelerator engine 530-3 is configured to invert the checksum prior to outputting the checksum in at least some situations. For example, the checksum accelerator engine 530-3 is configured to invert the calculated checksum when the checksum is generated based on an IP header, or, in at least some situations, based on a UDP header, in an embodiment. In an embodiment, the checksum accelerator engine 530-3 is configured to determine whether or not to invert a calculated checksum based on an instruction included in (e.g., encoded into) one or more trigger instructions that are used to transfer the respective segments to the checksum accelerator engine 530-3. For example, the PPN 502 is configured to encode a trigger instruction as a "load new checksum" instruction to indicate that no inversion of the calculated checksum is required, or to encode the trigger instruction as a "load old checksum" instruction to indicate that inversion of the calculated checksum is required, in an embodiment. In some embodiments and/or scenarios, the checksum accelerator engine 530-3 additionally or alternatively determines whether or not to invert a calculated checksum based on the value of the calculated checksum. For example, for a checksum calculated based on a UDP header, the checksum accelerator engine 530-3 is configured to invert the calculated checksum if the value of the calculated checksum is 0xFFF, in an embodiment.

Figure 6:
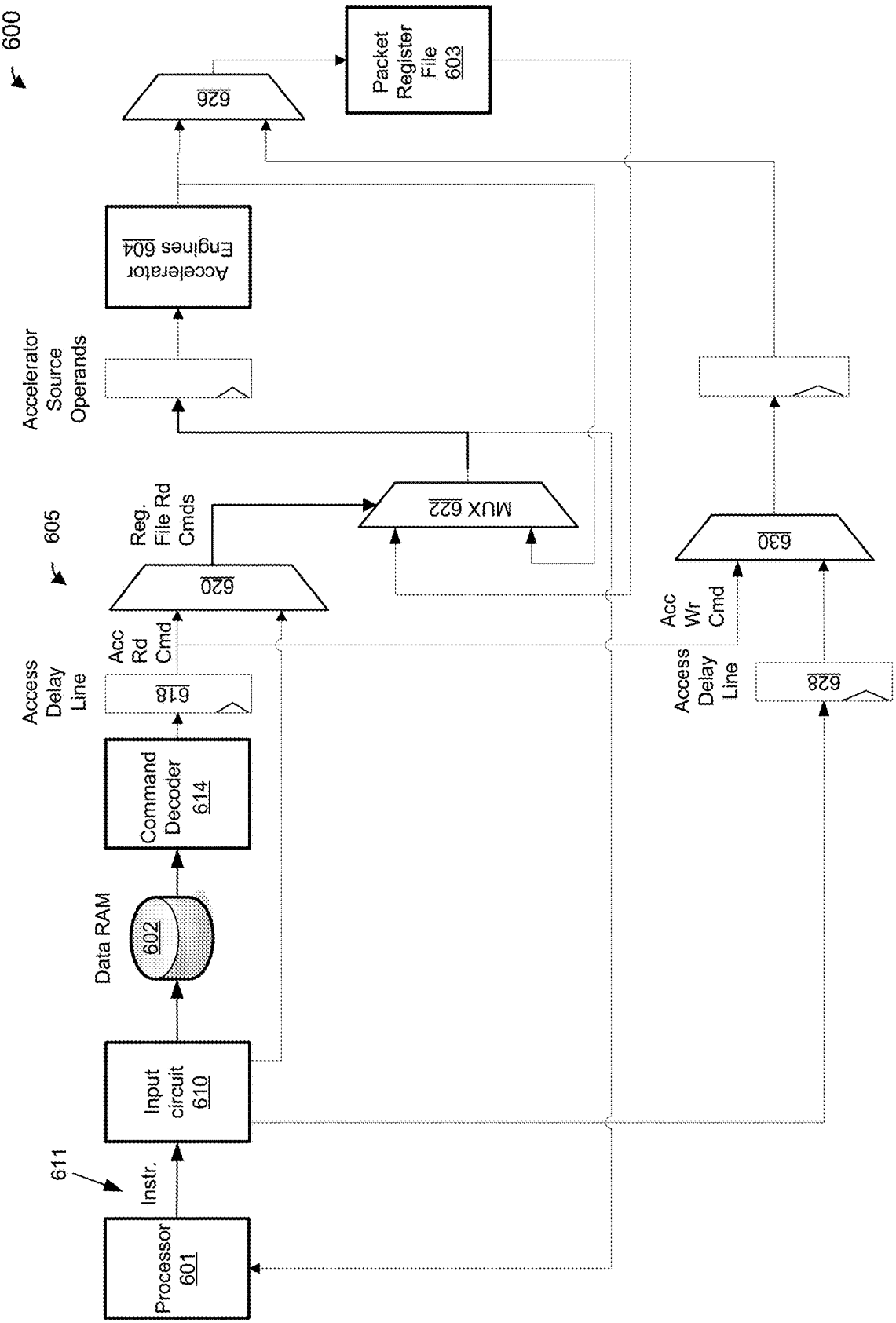
FIG. 6 is a block diagram of an example packet processing node included in the header alteration processor of FIG. 5, according to an embodiment.

FIG. 6 is a block diagram of an example packet processing node 600 included in a header alteration processor, according to an embodiment. In an embodiment, the packet processing node 600 corresponds to packet processing nodes 502 of the programmable header alteration processor 500 of FIG. 5, and the packet processing node is in the context of the programmable header alteration processor 500 of FIG. 5 for explanatory purposes. In other embodiments, however, the memory access system 600 is used with another suitable processor device other than the programmable header alteration processor 500 of FIG. 5.

The packet processing node 600 includes a processor 601, a scratch pad (e.g., a data RAM) 602 and a packet register file 603. The processor 601 is generally configured to implement a processing thread retrieved from the memory 504 to process a packet header provided to the processing node 600, according to an embodiment. In an embodiment, the processor 601 is a small general purpose CPU or another suitable processor configured to execute computer readable instructions stored in the memory 504. The packet processing node 600 additionally includes a plurality of accelerator engines 604 and a packet register file access system 605. The accelerator engines 604 correspond to the accelerator engines 530, in an embodiment. In another embodiment, the accelerator engines 604 additionally or alternatively include accelerator engines different from the accelerator engine 530. The packet register file access system 605 allows the processor 601 to use native CPU instructions, such as native CPU read/write instructions, to both trigger accelerator engines 604 and provide regular access to the packet register file 603 for read/write operations not related to accelerator engines 604, in an embodiment.

The packet register file 604 is configured to store packet information provided to the packet processing node 600 by the distributor 508, such as at least a portion of a packet header of a packet, a descriptor corresponding to the packet, metadata generated for the packet by the input processor 200 (FIG. 2), etc. The packet register file 603 is configured to also store various data generated during implementation of a processing thread with respect to the packet. The packet register file 603 is additionally configured to store data generated by the accelerator engines 604, such as portions of packet headers processed by the accelerator engines 604, in an embodiment. The packet register file 603 comprises, for example, an array of registers and/or a multi-port random access memory (RAM), in an embodiment. In other embodiments, the packet register file 603 is implemented in other suitable manners.

The packet register file access system 605 includes an input circuit 610 and an instruction decoder 614, in an embodiment. In operation, instructions 611 issued by the processor 601 are provided to the input circuit 610. The instructions 611 comprise read or write instructions, in an embodiment. The read or write instructions are encoded as accelerator engine instructions, in some situations, and are encoded as regular read or write instruction in other situations, in an embodiment. For example, the processor 601 is configured to encode a read instruction as an accelerator trigger instruction to trigger an accelerator engine 604 to perform an operation, in an embedment. As another example, the processor 601 is configured to encode a write instruction as an accelerator write instruction to dynamically write accelerator engine operand data to the packet register file 603 prior to triggering an accelerator engine 604 to perform an operation. In other embodiments, the instructions 611 comprise suitable types of instructions other than write/read instructions encoded as accelerator instructions.

The input circuit 610 includes circuitry configured to perform hazard resolution to resolve situations in which a read or write instruction is provided to the memory access system 600 concurrently (e.g., in a same clock cycle) with another read or write instruction or while the memory access system 600 is busy handling a previously issued read or write instruction. In an embodiment, the input circuit 602 includes a buffer (not shown) that temporarily buffers one or more instructions until the memory access system 600 is able to handle the one or more instructions.

Figure 7:
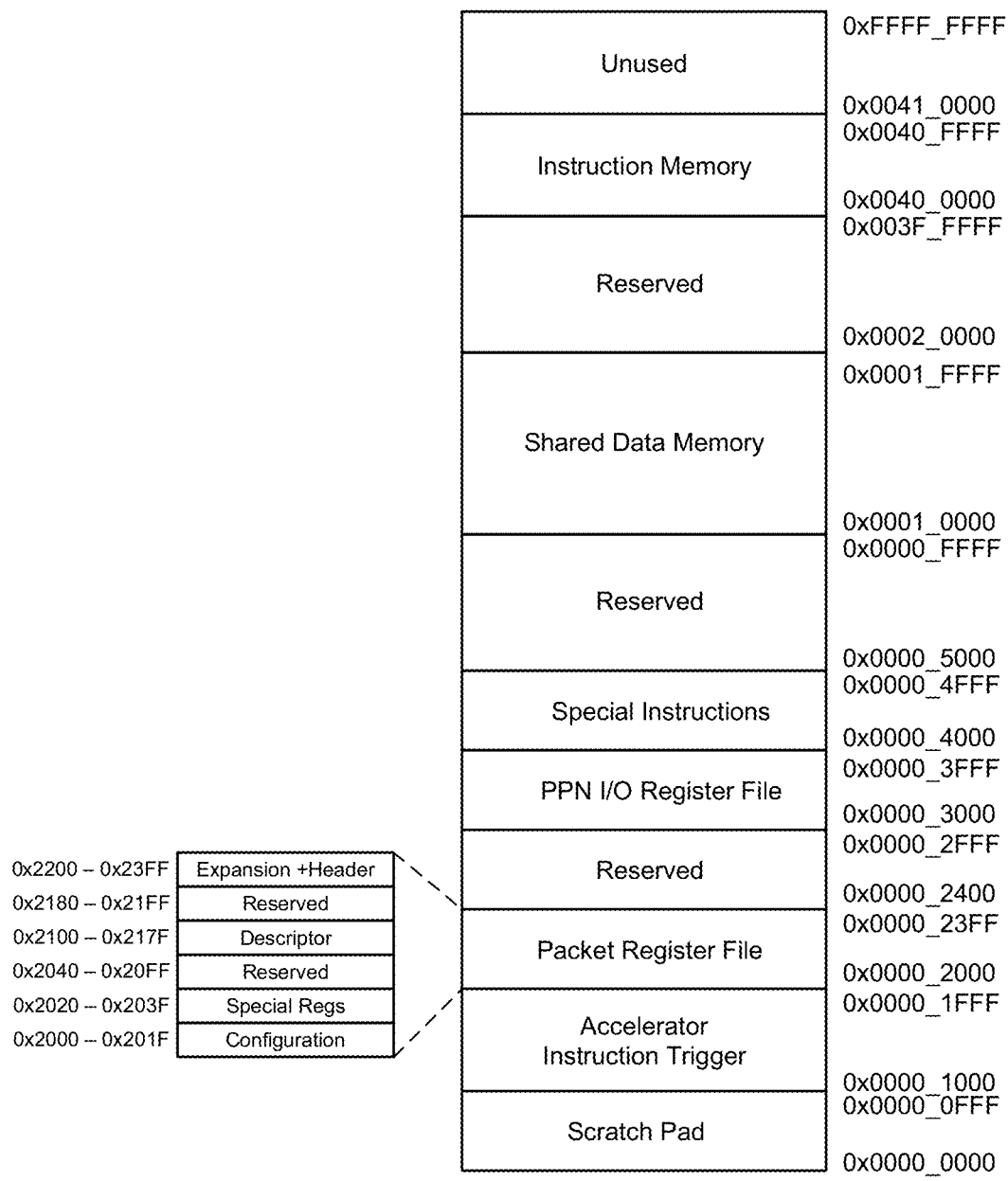
FIG. 7 is a block diagram of an example memory map used by a processor of the packet processing node of FIG. 6, according to an embodiment.

The input circuit 610 writes the instruction 611 to the scratch pad memory 602, in an embodiment, and the instruction decoder 614 decodes the instruction written to the scratch pad memory 602. In an embodiment, the instruction decoder 614 decodes the instruction 611 based on a memory map used by the processor 601, where the memory map includes mappings of both regular read/write instructions and read/write instructions encoded as accelerator instructions, according to an embodiment. FIG. 7 is a block diagram of an example memory map 700 used by the processor 601, according to an embodiment. The memory map 700 includes an accelerator instruction mapping 702 that maps instructions addressed to addresses in a first range of addresses to accelerator instructions, in an embodiment. Thus, for example, read/write instructions having addresses in the range of 0000 1000 to 0000 1FFF map to accelerator instructions, according to the memory map 700 in the illustrated embodiment. The memory map 700 additionally includes a packet register file mapping 704 that map instructions addressed to addresses in a second range of addresses to regular packet register file read/write instructions, in an embodiment. For example, read/write instructions having addresses in the range of 0000 2000 to 0000 23FF map to regular packet register file instructions, according to the memory map 700 in the illustrated embodiment.

Referring again FIGS. 6 and 7, in an embodiment, when the address of the instruction 611 is in the range of addresses mapped by the memory map 700 to accelerator instructions, the instruction decoder 614 decodes the instruction 611 as an accelerator instruction, such as a trigger instruction or an accelerator write instruction, in an embodiment. In an embodiment, the accelerator instruction 611 is a 32-bit processor instruction, and the accelerator trigger instruction 611 is described in the context of a 32-bit processor instruction for exemplary purposes. In other embodiments, however, other suitable processor instructions (e.g., 16-bit instructions, 64-bit instructions) are utilized. In an embodiment, bits [31:26] of the accelerator instruction are encoded to indicate a type of operation being requested by the accelerator instruction and, accordingly, a type of accelerator engine being triggered by the instruction. As an example, bits [31:26] of the accelerator instruction 611 are encoded to indicate that the accelerator instruction 611 is one of i) a byte copy instruction requesting a byte field copy operation, ii) a load new checksum instruction requesting a new checksum load operation, iii) a load old checksum instruction requesting an old checksum load operation, iv) a bit field copy instruction requesting a bit field copy operation, v) a bit field add instruction requesting a bit field add operation, vi) a bit field subtract instruction requesting a bit field subtract operation, etc. The remaining bits [25:0] of the accelerator instruction 611 are encoded to indicate locations of source and/or destination header fields, descriptor fields or configuration registers in the packet register file 603, in an embodiment. Example encoding of instructions, according to some embodiments, are described in more detail below with reference to FIGS. 8A-B.

The instruction decoder 614 determines whether the instruction 611 maps to an accelerator instruction or to a regular read/write instruction, in an embodiment. If the instruction 611 maps to an accelerator instruction, the instruction decoder 614 decodes the instruction as an accelerator trigger instruction or an accelerator write instruction, and extracts indications of relevant source/destination locations in the packet register file 603 that are source/destination fields of the corresponding instruction, in an embodiment. The accelerator trigger instructions decoded by the instruction decoder 604 and the regular CPU read instructions issued by the processor 601 are provided to a junction 620, in an embodiment. Similarly, the accelerator write instructions decoded by the instruction decoder 604 and regular write instructions issued by the processor 601 are provided to a junction 630. In an embodiment, to equalize time between issue of an accelerator instruction and the time the corresponding decoded accelerator instruction is provided to the junction 620/630 and the time between issue of a regular CPU read instruction and the time the regular CPU instruction is provided to the junction 620/630, the decoded accelerator instruction and/or the regular CPU instructions are provided to the junction 620/620 via one or more delay lines, such as delay lines 618/628 in FIG. 6.

The decoded accelerator trigger instruction controls a multiplexer 622 to select appropriate operand data for execution of the instruction. In an embodiment, the multiplexer 611 selects between operand data read from the packet register file 603 and operand data obtained from an accelerator engine 604, allowing for direct use of data generated by the accelerator engine 604 in a previously triggered operation for execution of the current accelerator trigger instruction, in an embodiment. Data generated by the accelerator engine 604 is also written to the packet register file 603 when the packet register file 603 contains the destination of the executed operation, as indicated by the accelerator trigger instruction 611, in an embodiment. Similarly, data requested to be written to the packet register file 603 by a regular CPU write instruction is written to the packet register file 603, in an embodiment. Further, data read from the packet processor file 603 in response to a regular CPU read instruction is provided directly to the processor 601, in an embodiment.

FIGS. 8A-B are diagrams illustrating several example accelerator instructions that correspond to instructions 611 issued by the processor 601, according to embodiments. FIG. 8A is a diagram of an example byte field operation instruction 800, according to an embodiment. FIG. 8A illustrates example bit allocations used in the byte field operation instruction 800. In other embodiments, suitable bit allocations different from the bit allocation illustrated in FIG. 8A are utilized.

In an embodiment, bits [31:26] of the instruction 800 are encoded to indicate a type of a byte field operation being triggered by the instruction 800. For example, a first value (e.g., 000000) of the bits [31:26] of the instruction 800 indicates that a byte field copy operation is triggered, a second value (e.g., 000001) of the bits [31:26] of the instruction 800 indicates that a checksum load operation is triggered, etc., in various embodiments. Bits [25:21] of the instruction 800 are encoded to indicate a subtype of the byte field operation, in some situations, in an embodiment. For example, when bits [31:26] of the instruction 800 are set to indicate a checksum load operation, bits [31:26] of the instruction 800 are set to indicate whether the instruction 800 is a load new checksum instruction for loading a newly calculated checksum into a packet header checksum field or a load old checksum instruction for loading an old checksum into a packet header checksum field, in an embodiment.

With continued reference to FIG. 8A, bits [20:15] of the instruction 800 are encoded to indicate a length of the destination/source fields of the operation, in an embodiment. In an embodiment, for example, bits [20:15] are set to a value corresponding to the length of the field minus one (Length−1). Bits [15:8] of the instruction 800 are encoded to indicate a location of the destination field to which the operation is to be applied, in an embodiment. In an embodiment, bit 15 of the instruction 800 is encoded to indicate whether the destination field of the operation is a packet header field or a non-packet header field, such as a packet descriptor field or other packet register field. Further, bits [14:8] of the instruction 800 are encoded to indicate an index of a first byte of the source field in a packet header in the packet register file 603, an index of a first byte of the source field in a packet descriptor in the packet register file 603, or an index of a first byte in a configuration register in the packet register file 603, in accordance with the indication encoded in bit 15, in an embodiment. Bits [7:0] of the instruction 800 are encoded to indicate a location of a source field from which source data of the operation is to be obtained, in an embodiment. In an embodiment, bit 7 of the instruction 800 is encoded to indicate whether the source field of the operation is a packet header field or a non-packet header field, such as a packet descriptor field or other packet register field. Further, bits [6:0] of the instruction 800 are encoded to indicate an index of a first byte of the source field in a packet header in the packet register file 603, an index of a first byte of the source field in a packet descriptor in the packet register file 603, or an index of a first byte in a configuration register in the packet register file 603, in accordance with the indication encoded in bit 7, in an embodiment.

FIG. 8B is a diagram of an example bit field operation instruction 850, according to an embodiment. FIG. 8B illustrates example bit allocations used in the bit field operation instruction 850. In other embodiments, suitable bit allocations different from the bit allocation illustrated in FIG. 8B are utilized. In an embodiment, bits [31:26] of the instruction 850 are encoded to indicate a type of a bit field operation being triggered by the instruction 850. For example, a first value (e.g., 000001) of the bits [31:26] of the instruction 850 indicates a byte field copy operation is triggered, a second value (e.g., 000010) of the bits [31:26] of the instruction 850 indicates a bit field add operation is triggered, a third value (e.g., 000011) of the bits [31:26] of the instruction 850 indicates a bit field subtract operation is triggered etc., in various embodiments. Bits [25:23] of the instruction 850 are encoded to indicate a beginning location of a set of destination bits of the operation, and bits [25:23]

of the instruction 850 are encoded to indicate a beginning location of a set of source bits of the operation, in an embodiment. Bits [19:16] are encoded to indicate a length (e.g., a number of bits) of the set of destination and source bits of the operation, in an embodiment.

With continued reference to FIG. 8B, bits [15:0] of the instruction 850 are encoded to indicate a byte location of the destination/source field that includes the set of bits indicated by the bits [25:16], in an embodiment. In an embodiment, bit 15 of the instruction 850 is encoded to indicate whether the destination/source field of the operation is a packet header field or a non-packet header field, such as a packet descriptor field or other packet register field. Further, bits [14:8] of the instruction 850 are encoded to indicate an index of a first byte of the source/destination field in a packet header in the packet register file 603, an index of a first byte of the source/destination field in a packet descriptor in the packet register file 603, or an index of a first byte in a configuration register in the packet register file 603, in accordance with the indication encoded in bit 15, in an embodiment. Similarly, bits [7:0] of the instruction 850 are encoded to indicate a location of a source field from which source data of the operation is to be obtained, in an embodiment. In an embodiment, bit 7 of the instruction 850 is encoded to indicate whether the source field of the operation is a packet header field or a non-packet header field, such as a packet descriptor field or other packet register field. Further, bits [6:0] of the instruction 850 are encoded to indicate an index of a first byte of the source field in a packet header in the packet register file 603, an index of a first byte of the source field in a packet descriptor in the packet register file 603, or an index of a first byte in a configuration register in the packet register file 603, in accordance with the indication encoded in bit 7, in an embodiment.

Figure 9:
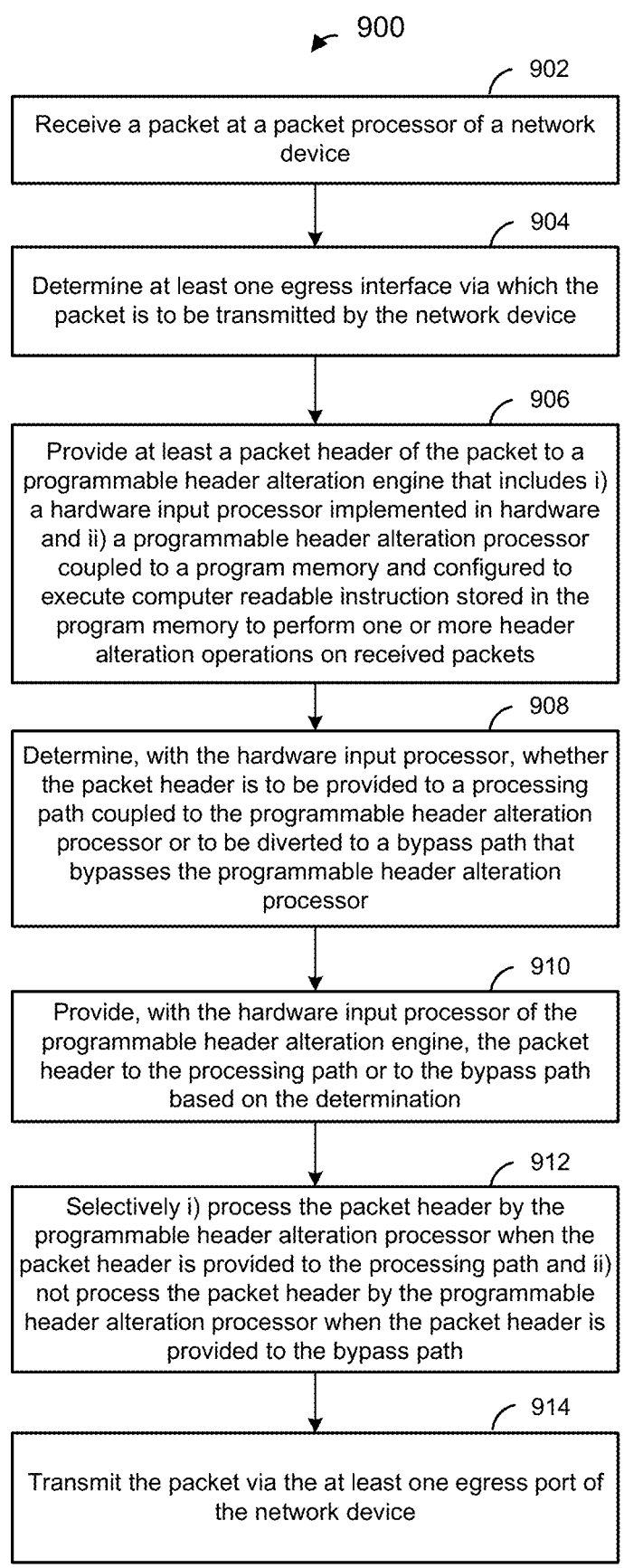
FIG. 9 is a flow diagram of an example method for processing packets in the network device of FIG. 1, according to an embodiment.

FIG. 9 is a flow diagram illustrating an example method 900 for processing packets in a network device, according to an embodiment. In an embodiment, the network device 100 implements the method 900 to process a packet received by the network device 100. Thus, the method 900 is described with reference to the network device 100 merely for explanatory purposes. In other embodiments, the method 900 is implemented by another suitable network device.

At a block 902, a packet received via a port of a network device is received by a packet processor of the network device. The packet received at block 902 includes a packet header and a payload, in an embodiment. In an embodiment, the packet is received by the packet processor 104 of the network device 100 of FIG. 1. In another embodiment, the packet is received by a suitable packet processor different from the receive processor 104 of the network device 100 of FIG. 1 and/or is received by a packet processor of a network device different from the network device 100 of FIG. 1.

At block 904, at least one egress interface via which the packet is to be transmitted by the network device is determined. In an embodiment, the forwarding engine 106 of the packet processor 104 of FIG. 1 determines the at least one egress interface via which the packet is to be transmitted. In another embodiment, another suitable device (other than the forwarding engine 106) determines the at least one egress interface via which the packet is to be transmitted.

At block 906, at least a packet header of the packet is provided to a programmable header alteration engine that includes i) a hardware input processor implemented in hardware and ii) a programmable header alteration processor coupled to a program memory and configured to execute computer readable instructions stored in the program memory to perform one or more header alteration operations on received packets. In an embodiment, the at least the packet header is provided to the programmable header alteration engine 110 of the packet processor 104 of FIG. 1. In this embodiment, the hardware input processor of the programmable header alteration engine corresponds to the input processor 118 of the programmable header alteration engine 110, and the programmable header alteration processor of the header alteration engine corresponds to the programmable header alteration processor 112. In other embodiments, the at least the packet header is provided to a programmable header alteration engine different from the programmable header alteration engine 110.

At block 908, it is determined whether the packet header is to be provided to a processing path coupled to the programmable header alteration processor or to be diverted to a bypass path that bypasses the programmable header alteration processor. In an embodiment, the hardware input processor of the programmable header alteration engine determines whether the packet header is to be provided to a processing path coupled to the programmable header alteration processor or to be diverted to a bypass path that bypasses the programmable header alteration processor. In an embodiment, the bypass decision engine 206 of the input processor 200 of FIG. 2 determines whether the packet is to be provided via a processing path to the programmable header alteration processor or to be diverted to a bypass path that bypasses the header alteration processor. In an embodiment, the method 300 of FIG. 3 is implemented to determine whether the packet is to be provided via a processing path to the programmable header alteration processor or to be diverted to a bypass path that bypasses the header alteration processor. In other embodiments, the determination at block 908 is made in other suitable manners.

At block 910, the packet header is provided to the processing path or to the bypass path based on the determination, made at block 909, of whether the packet header is to be provided to the processing path or to be diverted to the bypass path. In an embodiment, the hardware input processor of the programmable header alteration engine provides the packet header to the processing path or to the bypass path based on the determination, made at block 909, of whether the packet header is to be provided to the processing path or to be diverted to the bypass path.

At block 912, the packet header is selectively i) processed by the programmable header alteration processor when the packet header is provided to the processing path or ii) not processed by the programmable header alteration processor when the packet header is provided to the bypass path. In an embodiment, the programmable header alteration processor 112 of FIG. 1 or the programmable header alteration processor 500 of FIG. 5 selectively processes or does not process the packet header at block 912. In another embodiment, another suitable programmable header alteration processor selectively processes or does not process the packet header at block 912.

Generally, because the method 900 allows packets to dynamically bypass the header alteration processor, the method 900 allows packets that may not require header alteration by the programmable header alteration processor to quickly pass through the programmable header alteration engine, in an embodiment. For example, certain packet flow and/or packet types that do not require header alteration by the programmable header alteration engine are allowed to quickly pass through the programmable header alteration engine, in an embodiment. In some embodiments, certain packets and/or packet flows are allowed to bypass the header alteration processor during times of congestion in the header alteration processor. In at least some embodiments, allowing some packets to dynamically bypass the programmable header alteration processor increases processing power available for processing packets that require header alteration by the programmable header alteration processor as compared to systems that do not utilize dynamic bypass of a header alteration processor.

At block 914, the packet with the packet header selectively processed or not processed at block 910 is transmitted via the at least one egress interface of the network device determined at block 904.

Figure 10:
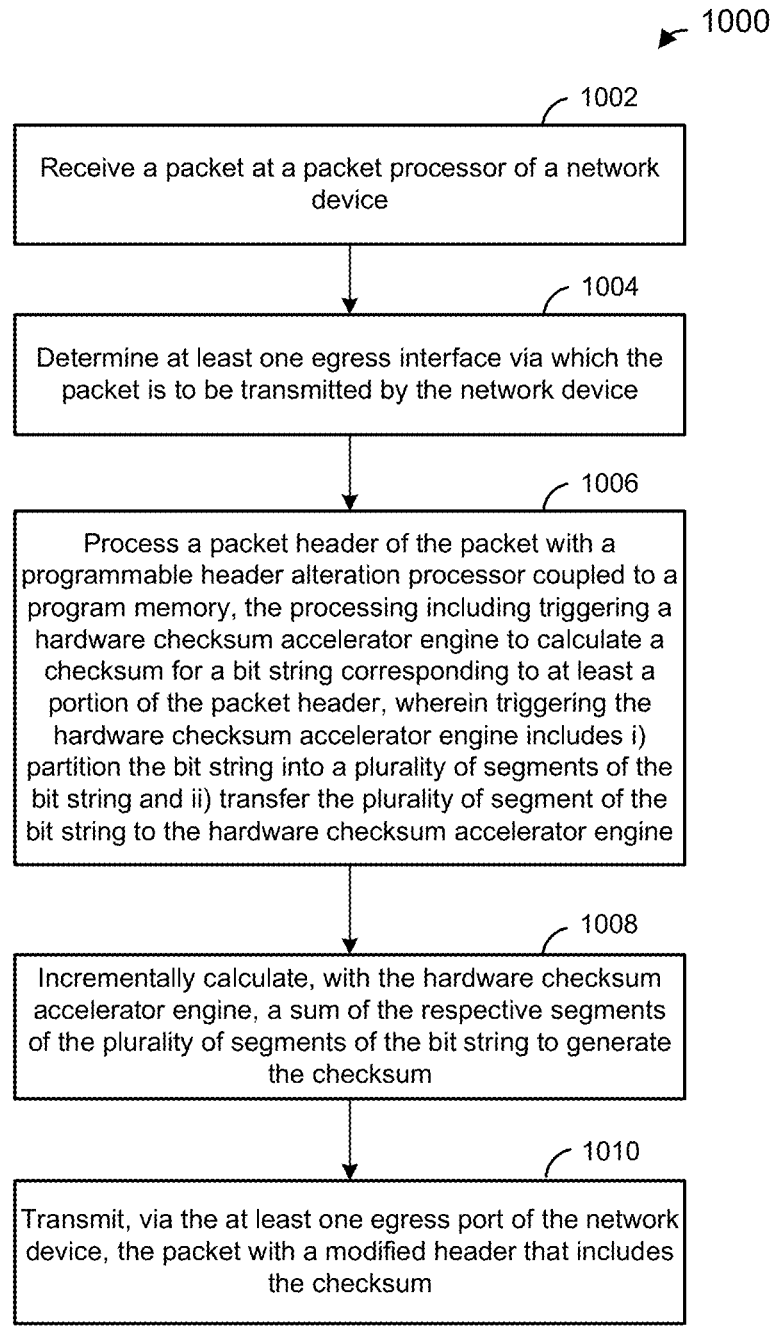
FIG. 10 is a flow diagram of an example method for processing packets in the network device of FIG. 1, according to another embodiment

FIG. 10 is a flow diagram illustrating an example method 100 for processing packets in a network device, according to another embodiment. In an embodiment, the network device 100 implements the method 1000 to process a packet received by the network device 100. Thus, the method 1000 is described with reference to the network device 100 merely for explanatory purposes. In other embodiments, the method 1000 is implemented by another suitable network device.

At a block 1002, a packet received via a port of a network device is received by a packet processor of the network device. The packet received at block 902 includes a packet header and a payload, in an embodiment. In an embodiment, the packet is received by the packet processor 104 of the network device 100 of FIG. 1. In another embodiment, the packet is received by a suitable packet processor different from the receive processor 104 of the network device 100 of FIG. 1 and/or is received by a packet processor of a network device different from the network device 100 of FIG. 1.

At block 1004, at least one egress interface via which the packet is to be transmitted by the network device is determined. In an embodiment, the forwarding engine 106 of the packet processor 104 of FIG. 1 determines the at least one egress interface via which the packet is to be transmitted. In another embodiment, another suitable device (other than the forwarding engine 106) determines the at least one egress interface via which the packet is to be transmitted.

At block 1006, a packet header of the packet is processed with a programmable header alteration processor coupled to a program memory and configured to execute computer readable instructions stored in the program memory to perform one or more header alteration operations on received packets. In an embodiment, the packet header is processed by the programmable header alteration processor 112 of FIG. 1. In another embodiment, the packet header is processed by a suitable programmable header alteration processor different from the programmable header alteration processor 112 of FIG. 1. In an embodiment, processing the packet header at block 1006 includes triggering a hardware checksum accelerator engine to calculate a checksum for a bit string corresponding to at least a portion of the packet header. In an embodiment, processing the packet header at block 1006 includes triggering the hardware checksum accelerator engine 530-3 of FIG. 5. In another embodiment, processing the packet header at block 1006 includes triggering a suitable hardware checksum accelerator engine different from the hardware checksum accelerator engine 530-3 of FIG. 5. In an embodiment, triggering the hardware checksum accelerator engine includes i) partitioning the bit string into a plurality of segments of the bit string and ii) transferring the plurality of segment of the bit string to the hardware checksum accelerator engine.

At block 1008, the checksum is incrementally calculated by the hardware checksum accelerator engine at least by incrementally summing the respective segments of the plurality of segments of the bit string. In an embodiment, incrementally summing the respective segments of the plurality of segments at block 1008 includes summing the plurality of segments in multiple summation stages. In an embodiment, incrementally summing the respective segments of the plurality of segments at block 1008 is performed in the manner described above in connection with the hardware checksum accelerator engine 530-3 of FIG. 5. In another embodiment, incrementally summing the respective segments of the plurality of segments at block 1008 is performed in other suitable manners. In an embodiment, incrementally summing the plurality of segments in multiple summation stages storing a result of a previous summation stage in an accumulator, the result of the previous summation stage corresponding to a sum of two or more segments, among the plurality of segments, transferred to the hardware checksum accelerator engine, and in a subsequent summation stage, summing the result of the previous summation stage, stored in the accumulator, with a subsequent segment, among the plurality of segments, transferred to the hardware checksum accelerator engine.

In at least some embodiments, because respective segments of a bit string are serially transferred to the hardware checksum accelerator engine at block 1006 and are used to incrementally calculate a checksum by the hardware checksum accelerator engine at block 1008, the method 1000 allows for a smaller hardware checksum accelerator engine, in terms of size, power consumption, etc., to be used as compared to a system in which an entire bit string is provided in a same clock cycle to a checksum engine and the checksum is calculated on the entire bit string, particularly when relatively long bit strings need checksum calculation.

At block 1010, the packet with a modified packet header that includes the checksum incrementally calculated at block 1008 is transmitted via the at least one egress interface of the network device determined at block 1004.

In an embodiment, a method for processing packets in a network device includes: receiving, at a packet processor of the network device, a packet received by the network device from a network link; determining, with the packet processor, at least one egress interface via which the packet is to be transmitted by the network device; providing at least a packet header of the packet to a programmable header alteration engine of the packet processor, the programmable header alteration engine including i) a hardware input processor implemented in hardware and ii) a programmable header alteration processor coupled to a program memory, the programmable header alteration processor being configured to execute computer readable instructions stored in the program memory to perform one or more header alteration operations on received packets; determining, with the hardware input processor of the programmable header alteration engine, whether the packet header is to be provided to a processing path coupled to the programmable header alteration processor or to be diverted to a bypass path that bypasses the programmable header alteration processor; providing, with the hardware input processor of the programmable header alteration engine, the packet header to the processing path or to the bypass path based on the determination of whether the packet header is to be provided to the processing path or to be diverted to the bypass path; selectively i) processing the packet header by the programmable header alteration processor when the packet header is provided to the processing path and ii) not processing the packet header by the programmable header alteration processor when the packet header is provided to the bypass path; and transmitting, with the network device, the packet via the at least one egress interface of the network device.

In other embodiments, the method also includes one of, or any suitable combination of two or more of, the following features.

The method further comprises determining, with the packet processor, a packet flow to which the packet belongs.

The method further comprises determining whether the packet header is to be provided to the processing path or to be diverted to the bypass path comprises determining, based at least in part on the packet flow to which the packet belongs, whether the packet header is to be provided to the processing path or to be diverted to the bypass path.

Determining whether the packet header is to be provided to the processing path or to be diverted to the bypass path comprises determining, based on one or more statistical attributes associated with the packet, whether the packet header is to be provided to the processing path or to be diverted to the bypass path.

Determining whether the packet header is to be provided to the processing path or to be diverted to the bypass path comprises determining, based at least in part on i) a congestion level of the programmable header alteration processor and ii) one or more congestion handing attributes associated with the packet, whether the packet header is to be provided to the processing path or to be diverted to the bypass path.

The method further comprises, when it is determined that the packet header is to be diverted to the bypass path, storing the packet header in a unified buffer in parallel with the programmable header alteration processor, the unified buffer configured to temporarily store i) packet headers of packets that bypass the programmable header alteration processor and ii) at least portions of packet headers that do not bypass the programmable header alteration processor, wherein the portions of the packet headers are not needed for processing by the programmable header alteration processor.

The method further comprises, when it is determined that the packet header is to be provided to the processing path: extracting one or more portions of the packet header to be provided to the programmable header alteration processor, generating a header alteration processor accessible header to include the one or more portions extracted from the packet header, the header alteration processor accessible header being separate from the packet header, providing the header alteration accessible header, rather than the packet header, to the programmable header alteration processor, processing, with the programmable header alteration processor, the header alteration accessible header, and after processing the header alteration accessible header with the programmable header alteration processor, integrating the processed header alteration accessible header into the packet header.

The method further comprises generating, with the hardware input processor of the programmable header alteration engine, metadata to include at least an indicator of a processing thread, stored in the program memory, to be implemented to process the packet header by the programmable header alteration processor, and providing, with the hardware input processor of the programmable header alteration engine, the metadata along with the alteration accessible header to the programmable header alteration processor.

Providing the metadata along with the alteration accessible header to the programmable header alteration processor includes splitting information comprising the metadata and the alteration accessible header into a plurality of chunks, and serially transferring respective chunks, among the plurality of chunks, to the programmable header alteration processor, wherein an initial chunk of the plurality of chunks transferred to the programmable header alteration processor includes at least the indicator of the processing thread, stored in the program memory, to be implemented to process the packet by the programmable header alteration processor.

The method further comprises, prior to receiving an initial portion of the alteration accessible header at the programmable header alteration processor, retrieving, with the programmable header alteration processor, based on the indicator, of the processing thread, included in the initial chunk of the plurality of chunks, a set of computer readable instructions from the program memory to be used for processing the alteration accessible header.

The programmable header alteration processor includes a plurality of processing nodes.

The method further comprises, when it is determined that the packet header is to be provided to the processing path, providing at least a portion of the packet header to a processing node, among the plurality of processing nodes, for processing of the packet header by the processing node, wherein processing of the packet header by the processing node is performed in parallel with processing of another packet header, corresponding to another packet received by the network device, by another processing node among the plurality of processing nodes.

Processing the packet header by the programmable header alteration processor includes executing, with the programmable header alteration processor, a set of computer readable instructions retrieved from the packet memory, including, during execution of the set of computer readable instructions, triggering one or more hardware accelerator engines to perform one or more specific processing operations with respect to the packet header.

Triggering a hardware accelerator engine among the one or more hardware accelerator engines includes issuing a native central processing unit (CPU) instruction of a processing node of the programmable header alteration processor, and mapping, based on an address indicated in the native CPU instruction, the native CPU instruction to an accelerator trigger instruction to trigger the hardware accelerator engine.

In another embodiment, a network device comprises a packet processor configured to i) receive a packet from a network link and ii) determine at least one egress interface via which the packet is to be transmitted by the network device, and a programmable header alteration engine including i) a hardware input processor implemented in hardware and ii) a programmable header alteration processor coupled to a program memory, the programmable header alteration processor configured to execute computer readable instructions stored in the program memory to perform one or more header alteration operations on received packets. The hardware input processor is configured to determine whether a packet header of the packet is to be provided to a processing path coupled to the programmable header alteration processor or to be diverted to a bypass path that bypasses the programmable header alteration processor, and provide the packet header to the processing path or to the bypass path based on the determination of whether the packet header is to be provided to the processing path or to be diverted to the bypass path. The programmable header alteration processor is configured to selectively i) process the packet header when the packet header is provided to the processing path and ii) not process the packet header when the packet header is provided to the bypass path. The packet processor is further configured to cause the packet to be transmitted via the at least one egress interface of the network device.

In other embodiments, the network device also comprises one of, or any suitable combination of two or more of, the following features.

The packet processor is further configured to determine a packet flow to which the packet belongs.

The hardware input processor is configured to determine, based at least in part on the packet flow to which the packet belongs, whether the packet header is to be provided to the processing path or to be diverted to the bypass path.

The hardware input processor is configured to determine, based on one or more statistical attributes associated with the packet, whether the packet header is to be provided to the processing path or to be diverted to the bypass path.

The hardware input processor is configured to determine, based at least in part on i) a congestion level of the programmable header alteration processor and ii) one or more congestion handing attributes associated with the packet, whether the packet header is to be provided to the processing path or to be diverted to the bypass path.

The hardware input processor is further configured to, when it is determined that the packet header is to be provided to the bypass path, store the packet header in a unified buffer in parallel with the programmable header alteration processor, the unified buffer configured to temporarily store i) packet headers of packets that bypass the programmable header alteration processor and ii) at least portions of packet headers that do not bypass the programmable header alteration processor, wherein the portions of the packet headers are not needed for processing by the header alteration processor.

The hardware input processor is further configured to, when it is determined that the packet header is to be provided to the processing path: extract one or more portions of the packet header to be provided to the programmable header alteration processor, generate a header alteration processor accessible header to include the one or more portions extracted from the packet header, the header alteration processor accessible header being separate from the packet header, and provide the header alteration accessible header, rather than the packet header, to the header alteration processor.

The hardware input processor is further configured to generate metadata corresponding to the packet, the metadata including at least an indicator of a processing thread, stored in the program memory, to be implemented to process the packet header by the programmable header alteration processor, and provide the metadata along with the alteration accessible header to the header alteration processor.

The hardware input processor is configured to split information comprising the metadata and the alteration accessible header into a plurality of chunks, and serially transfer respective chunks, among the plurality of chunks, to the programmable header alteration processor, wherein an initial chunk of the plurality of chunks transferred to the programmable header alteration processor includes the indicator of the processing thread, stored in the packet memory, to be implemented to process the packet header by the programmable header alteration processor.

The programmable header alteration processor is configured to, prior to receiving an initial portion of the alteration accessible header at the programmable header alteration processor, retrieve, from the program memory based on the indicator, of the processing thread, included in the initial chunk of the plurality of chunks, a set of computer readable instructions to be used for processing the alteration accessible header.

The programmable header alteration processor includes a plurality of processing nodes.

The hardware input processor is configured to, when it is determined that the packet header is to be provided to the processing path, provide at least a portion of the packet header to a processing node, among the plurality of processing nodes, for processing of the packet header by the processing node, wherein processing of the packet header by the processing node is performed in parallel with processing of another packet header, corresponding to another packet received by the network device, by another processing node among the plurality of processing nodes.

The programmable header alteration processor is configured to execute a set of computer readable instructions, retrieved from the packet memory, to process the packet header, the programmable header alteration processor being configured to, during execution of the set of computer readable instructions, trigger one or more hardware accelerator engines to perform specific one or more processing operations with respect to the packet header, wherein the header alteration processor is configured to trigger an accelerator engine among the one or more accelerator engines at least by issuing a native CPU instruction of a processing node of the header alteration processor, wherein the native CPU instruction is mapped, based on an address indicated in the native CPU instruction, to an accelerator trigger instruction to trigger the hardware accelerator engine.

In yet another embodiment, a method for processing packets in a network device includes: receiving, at a packet processor of the network device, a packet received by the network device from a network link; determining, with the packet processor, at least one egress interface via which the packet is to be transmitted by the network device; processing a packet header of the packet with a programmable header alteration processor coupled to a program memory, the programmable header alteration processor being configured to execute computer readable instructions stored in the program memory to perform one or more header alteration operations on received packets, the processing including triggering a hardware checksum accelerator engine to calculate a checksum for a bit string corresponding to at least a portion of the packet header, wherein triggering the hardware checksum accelerator engine includes i) partitioning the bit string into a plurality of segments of the bit string and ii) transferring the plurality of segment of the bit string to the hardware checksum accelerator engine; incrementally calculating, with the hardware checksum accelerator, the checksum at least by incrementally summing the respective segments, among the plurality of segments of the bit string, transferred to the hardware checksum accelerator engine; and transmitting, via the at least one egress interface of the network device, the packet with a modified header that includes the checksum.

In other embodiments, the method also includes one of, or any suitable combination of two or more of, the following features.

Triggering the hardware checksum accelerator engine includes generating, with the programmable header alteration processor, respective trigger instructions to transfer respective segments of the plurality of segments of the bit string to the hardware checksum accelerator engine, and serially providing the respective trigger instructions to the hardware checksum accelerator engine.

Triggering the hardware checksum accelerator engine includes issuing one or more native central processing unit (CPU) instructions supported by the programmable header alteration processor, and mapping, based on an address indicated in the one or more native CPU instructions, each of the one or more native CPU instructions to an accelerator trigger instruction for triggering the hardware checksum accelerator engine.

Incrementally calculating the checksum includes incrementally summing, with the hardware checksum accelerator engine, the plurality of segments in multiple summation stages, including storing a result of a previous summation stage in an accumulator, the result of the previous summation stage corresponding to a sum of two or more segments, among the plurality of segments, transferred to the hardware checksum accelerator engine, and in a subsequent summation stage, summing the result of the previous summation stage, stored in the accumulator, with a subsequent segment, among the plurality of segments, transferred to the hardware checksum accelerator engine.

Incrementally calculating the checksum further includes wrapping one or more carry bits generated in the previous summation stage back into the accumulator in a same clock cycle in which the previous summation stage is performed by the hardware checksum accelerator engine.

The method further comprises determining, with the hardware checksum accelerator engine based on information provided by the programmable header alteration processor to the hardware checksum accelerator engine, whether or not the checksum is to be inverted, and in response to determining that the checksum is to be inverted, inverting the checksum prior to outputting the checksum from the hardware checksum accelerator engine.

Triggering the hardware checksum accelerator engine to calculate the checksum for the bit string includes providing, to the hardware checksum accelerator engine, an indication of a memory location in a memory to which the checksum is to be written.

The method further comprises comprising causing, with the hardware checksum accelerator engine, the checksum to be written to the indicated memory location in the memory.

Triggering the hardware checksum accelerator engine to calculate the checksum for the bit string comprises triggering the hardware checksum accelerator engine to calculate the checksum for a bit string corresponding to one of i) an internet protocol (IP) header included in the packet header, ii) a user datagram protocol (UDP) header included in the packet header or iii) a generic UDP encapsulation (GUE) header included in the packet header.

In still another embodiment, a network device comprises a packet processor configured to i) receive a packet from a network link, the packet including a packet header and a payload and ii) determine at least one egress interface via which the packet is to be transmitted by the network device, and a programmable header alteration processor coupled to a program memory, the programmable header alteration processor configured to execute computer readable instructions stored in the program memory to perform one or more header alteration operations on packet headers of received packets, the programmable header alteration processor being configured to, during processing of a packet header of a received packet, trigger a hardware checksum accelerator engine to calculate a checksum for a bit string corresponding to at least a portion of the packet header. The programmable header alteration processor is configured to partition the bit string into a plurality of segments of the bit string, and transfer the plurality of segment of the bit string to the hardware checksum accelerator engine. The hardware checksum accelerator engine is configured to incrementally calculating the checksum at least by incrementally summing the respective segments, among the plurality of segments of the bit string, transferred to the hardware checksum accelerator engine. The packet processor is further configured cause the packet with a modified header that includes the checksum to be transmitted via the at least one egress interface of the network device.

In other embodiments, the network device also comprises one of, or any suitable combination of two or more of, the following features.

The programmable header alteration processor is configured to generate respective trigger instructions to transfer respective segments of the plurality of segments of the bit string to the hardware checksum accelerator engine, and serially provide the respective trigger instructions to the hardware checksum accelerator engine.

The programmable header alteration processor is configured to trigger the hardware checksum accelerator engine at least by issuing one or more native CPU instructions supported by the programmable header alteration processor, wherein each of the one or more native CPU instructions is mapped, based on an address indicated in the native CPU instruction, to an accelerator trigger instruction for triggering the hardware checksum accelerator engine.

The hardware checksum accelerator engine is configured to incrementally calculate the checksum at least by summing the plurality of segments over multiple summation stages.

The hardware checksum accelerator engine is configured to store a result of a previous summation stage in an accumulator, the result of the previous summation stage corresponding to a sum of two or more segments, among the plurality of segments, transferred to the hardware checksum accelerator engine, and in a subsequent summation stage, sum the result of the previous summation stage, stored in the accumulator, with a subsequent segment, among the plurality of segments, transferred to the hardware accelerator engine.

The hardware checksum accelerator engine is further configured to wrap one or more carry bits generated in the previous summation stage back into the accumulator in a same clock cycle in which the previous summation stage is performed by the hardware checksum accelerator engine.

The hardware checksum accelerator engine is further configured to determine, based on information provided by the programmable header alteration processor to the hardware checksum accelerator engine, whether or not the checksum is to be inverted, and in response to determining that the checksum is to be inverted, invert the checksum prior to outputting the checksum.

The programmable header alteration processor is further configured to provide, to the hardware checksum accelerator engine, an indication of a memory location in a memory to which the checksum is to be written.

The hardware checksum accelerator engine is further configured to cause the checksum to be written to the indicated memory location in the memory.

The programmable header alteration processor is configured to trigger the hardware checksum accelerator engine to calculate the checksum for one of i) an internet protocol (IP) header included in the packet header, ii) a user datagram protocol (UDP) header included in the packet header or iii) a generic UDP encapsulation (GUE) header included in the packet header.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for processing packets in a network device, the method comprising:
   receiving, at a packet processor of the network device, a packet received by the network device from a network link;
   determining, with the packet processor, at least one egress interface via which the packet is to be transmitted by the network device;
   providing at least a packet header of the packet to a programmable header alteration engine of the packet processor, the programmable header alteration engine including i) a hardware input processor implemented in hardware and ii) a programmable header alteration processor coupled to a program memory, the programmable header alteration processor being configured to execute computer readable instructions stored in the program memory to perform one or more header alteration operations on received packets;
   receiving, at the hardware input processor of the programmable header alteration engine within the network device, an indication of a congestion level of the programmable header alteration processor within the network device;
   determining, with the hardware input processor of the programmable header alteration engine and using at least the indication of the congestion level of the programmable header alteration processor, whether the packet header is to be provided to the programmable header alteration processor within the network device;
   determining, with the hardware input processor of the programmable header alteration engine and using at least the indication of the congestion level of the programmable header alteration processor, whether the packet header is to be diverted to a bypass path within the network device that bypasses the programmable header alteration processor within the network device;
   in response to determining that the packet header is to be provided to the programmable alteration processor, providing, with the hardware input processor of the programmable header alteration engine within the network device, the packet header to a processing path within the network device that is coupled to the programmable header alteration processor within the network device;
   in response to determining that the packet header is to be diverted to the bypass path that bypasses the programmable header alteration processor, providing, with the hardware input processor of the programmable header alteration engine within the network device, the packet header to the bypass path within the network device;
   selectively i) processing the packet header by the programmable header alteration processor when the packet header is provided to the processing path and ii) not processing the packet header by the programmable header alteration processor when the packet header is provided to the bypass path; and
   transmitting, with the network device, the packet via the at least one egress interface of the network device.

2. The method of claim 1, wherein:
   the method further comprises determining, with the packet processor, a packet flow to which the packet belongs,
   determining whether the packet header is to be provided to the programmable alteration processor comprises determining, based at least in part on the packet flow to which the packet belongs, whether the packet header is to be provided to the programmable alteration processor, and
   determining whether the packet header is to be diverted to the bypass path comprises determining, based at least in part on the packet flow to which the packet belongs, whether the packet header is to be diverted to the bypass path.

3. The method of claim 2, wherein:
   determining whether the packet header is to be provided to the programmable alteration processor comprises determining, based on one or more statistical attributes associated with the packet, whether the packet header is to be provided to the programmable alteration processor, and
   determining whether the packet header is to be diverted to the bypass path comprises determining, based on one or more statistical attributes associated with the packet, whether the packet header is to be diverted to the bypass path.

4. The method of claim 1, wherein:
   determining whether the packet header is to be provided to the programmable alteration processor comprises determining whether the packet header is to be provided to the programmable alteration processor further using one or more congestion handling attributes of i) a packet type to which the packet corresponds or ii) a packet flow to which the packet belongs, and
   determining whether the packet header is to be diverted to the bypass path comprises determining whether the packet header is to be diverted to the bypass path further using the one or more congestion handling attributes of i) the packet type to which the packet corresponds or ii) the packet flow to which the packet belongs.

5. The method of claim 1, further comprising: when it is determined that the packet header is to be diverted to the bypass path, storing the packet header in a unified buffer within the network device in parallel with the programmable header alteration processor, the unified buffer configured to temporarily store i) packet headers of packets that bypass the programmable header alteration processor and ii) at least portions of packet headers that do not bypass the programmable header alteration processor, wherein the portions of the packet headers are not needed for processing by the programmable header alteration processor.

6. The method of claim 1, further comprising, when it is determined that the packet header is to be provided to the programmable alteration processor:
  extracting one or more portions of the packet header to be provided to the programmable header alteration processor,
  generating a header alteration processor accessible header to include the one or more portions extracted from the packet header, the header alteration processor accessible header being separate from the packet header,
  providing the header alteration accessible header, rather than the packet header, to the programmable header alteration processor,
  processing, with the programmable header alteration processor, the header alteration accessible header, and
  after processing the header alteration accessible header with the programmable header alteration processor, integrating the processed header alteration accessible header into the packet header.

7. The method of claim 6, further comprising:
  generating, with the hardware input processor of the programmable header alteration engine, metadata to include at least an indicator of a processing thread, stored in the program memory, to be implemented to process the packet header by the programmable header alteration processor, and
  providing, with the hardware input processor of the programmable header alteration engine, the metadata along with the alteration accessible header to the programmable header alteration processor.

8. The method of claim 7, wherein providing the metadata along with the alteration accessible header to the programmable header alteration processor includes:
  splitting information comprising the metadata and the alteration accessible header into a plurality of chunks, and
  serially transferring respective chunks, among the plurality of chunks, to the programmable header alteration processor, wherein an initial chunk of the plurality of chunks transferred to the programmable header alteration processor includes at least the indicator of the processing thread, stored in the program memory, to be implemented to process the packet by the programmable header alteration processor.

9. The method of claim 8, further comprising: prior to receiving an initial portion of the alteration accessible header at the programmable header alteration processor, retrieving, with the programmable header alteration processor, based on the indicator, of the processing thread, included in the initial chunk of the plurality of chunks, a set of computer readable instructions from the program memory to be used for processing the alteration accessible header.

10. The method of claim 1, wherein:
  the programmable header alteration processor includes a plurality of processing nodes, and
  the method further comprises, when it is determined that the packet header is to be provided to the programmable alteration processor, providing at least a portion of the packet header to a processing node, among the plurality of processing nodes, for processing of the packet header by the processing node, wherein processing of the packet header by the processing node is performed in parallel with processing of another packet header, corresponding to another packet received by the network device, by another processing node among the plurality of processing nodes.

11. The method of claim 1, wherein processing the packet header by the programmable header alteration processor includes executing, with the programmable header alteration processor, a set of computer readable instructions retrieved from the packet memory, including, during execution of the set of computer readable instructions, triggering one or more hardware accelerator engines to perform one or more specific processing operations with respect to the packet header, and wherein triggering a hardware accelerator engine among the one or more hardware accelerator engines includes:
  issuing a native central processing unit (CPU) instruction of a processing node of the programmable header alteration processor, and
  mapping, based on an address indicated in the native CPU instruction, the native CPU instruction to an accelerator trigger instruction to trigger the hardware accelerator engine.

12. A network device, comprising:
  a packet processor configured to i) receive a packet from a network link and ii) determine at least one egress interface via which the packet is to be transmitted by the network device; and
  a programmable header alteration engine including i) a hardware input processor implemented in hardware and ii) a programmable header alteration processor coupled to a program memory, the programmable header alteration processor configured to execute computer readable instructions stored in the program memory to perform one or more header alteration operations on received packets, wherein:
    the hardware input processor is configured to:
      receive an indication of a congestion level of the programmable header alteration processor,
      determine, using at least the indication of the congestion level of the programmable header alteration processor, whether the packet header is to be provided to the programmable header alteration processor,
      determine, using at least the congestion level of the programmable header alteration processor, whether a packet header of the packet is to be diverted to a bypass path that bypasses the programmable header alteration processor, and
      in response to determining that the packet header is to be provided to the programmable alteration processor, provide the packet header to a processing path coupled to the programmable header alteration processor, and
      in response to determining that the packet header is to be diverted to the bypass path that bypasses the programmable header alteration processor, provide the packet header to the bypass path;
    wherein the programmable header alteration processor is configured to selectively i) process the packet header when the packet header is provided to the processing path and ii) not process the packet header when the packet header is provided to the bypass path; and
    wherein the packet processor is further configured to cause the packet to be transmitted via the at least one egress interface of the network device.

13. The network device of claim 12, wherein:
  the packet processor is further configured to determine a packet flow to which the packet belongs,
  the hardware input processor is configured to determine, based at least in part on the packet flow to which the packet belongs, whether the packet header is to be provided to the programmable alteration processor, and the hardware input processor is further configured to determine, based at least in part on the packet flow to which the packet belongs, whether the packet header is to be diverted to the bypass path.

14. The network device of claim 12, wherein the hardware input processor is configured to:

determine whether the packet header is to be provided to the programmable alteration processor further using one or more statistical attributes associated with the packet, and determine whether the packet header is to be diverted to the bypass path further using one or more statistical attributes associated with the packet.

15. The network device of claim 12, wherein the hardware input processor is configured to:

determine whether the packet header is to be provided to the programmable alteration processor further using one or more congestion handing attributes associated with the packet, and determine whether the packet header is to be diverted to the bypass path further using one or more congestion handing attributes associated with the packet.

16. The network device of claim 12, wherein the hardware input processor is further configured to, when it is determined that the packet header is to be provided to the bypass path, store the packet header in a unified buffer within the network device in parallel with the programmable header alteration processor, the unified buffer configured to temporarily store i) packet headers of packets that bypass the programmable header alteration processor and ii) at least portions of packet headers that do not bypass the programmable header alteration processor, wherein the portions of the packet headers are not needed for processing by the programmable header alteration processor.

17. The network device of claim 12, wherein the hardware input processor is further configured to, when it is determined that the packet header is to be provided to the programmable alteration processor:

extract one or more portions of the packet header to be provided to the programmable header alteration processor, generate a header alteration processor accessible header to include the one or more portions extracted from the packet header, the header alteration processor accessible header being separate from the packet header, and provide the header alteration accessible header, rather than the packet header, to the programmable header alteration processor.

18. The network device of claim 17, wherein the hardware input processor is further configured to:

generate metadata corresponding to the packet, the metadata including at least an indicator of a processing thread, stored in the program memory, to be implemented to process the packet header by the programmable header alteration processor, and provide the metadata along with the alteration accessible header to the programmable header alteration processor.

19. The network device of claim 18, wherein the hardware input processor is configured to:

split information comprising the metadata and the alteration accessible header into a plurality of chunks, and serially transfer respective chunks, among the plurality of chunks, to the programmable header alteration processor, wherein an initial chunk of the plurality of chunks transferred to the programmable header alteration processor includes the indicator of the processing thread, stored in the packet memory, to be implemented to process the packet header by the programmable header alteration processor.

20. The network device of claim 19, wherein the programmable header alteration processor is configured to, prior to receiving an initial portion of the alteration accessible header at the programmable header alteration processor, retrieve, from the program memory based on the indicator, of the processing thread, included in the initial chunk of the plurality of chunks, a set of computer readable instructions to be used for processing the alteration accessible header.

21. The network device of claim 12, wherein:

the programmable header alteration processor includes a plurality of processing nodes, and the hardware input processor is configured to, when it is determined that the packet header is to be provided to the programmable alteration processor, provide at least a portion of the packet header to a processing node, among the plurality of processing nodes, for processing of the packet header by the processing node, wherein processing of the packet header by the processing node is performed in parallel with processing of another packet header, corresponding to another packet received by the network device, by another processing node among the plurality of processing nodes.

22. The network device of claim 12, wherein the programmable header alteration processor is configured to:

execute a set of computer readable instructions, retrieved from the packet memory, to process the packet header, during execution of the set of computer readable instructions, trigger one or more hardware accelerator engines to perform specific one or more processing operations with respect to the packet header, trigger an accelerator engine among the one or more accelerator engines at least by issuing a native CPU instruction of a processing node of the programmable header alteration processor, wherein the native CPU instruction is mapped, based on an address indicated in the native CPU instruction, to an accelerator trigger instruction to trigger the hardware accelerator engine.

* * * * *